(12) United States Patent
Onishi et al.

(10) Patent No.: US 10,967,269 B2
(45) Date of Patent: Apr. 6, 2021

(54) GAME SYSTEM, GAME CONTROL DEVICE, AND INFORMATION STORAGE MEDIUM

(71) Applicant: KONAMI DIGITAL ENTERTAINMENT CO., LTD., Tokyo (JP)

(72) Inventors: Takashi Onishi, Tokyo (JP); Hiromichi Ito, Tokyo (JP); Seitaro Kimura, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 30 days.

(21) Appl. No.: 15/894,938

(22) Filed: Feb. 13, 2018

(65) Prior Publication Data

US 2018/0169525 A1    Jun. 21, 2018

Related U.S. Application Data

(63) Continuation of application No. PCT/JP2016/069777, filed on Jul. 4, 2016.

(30) Foreign Application Priority Data

Sep. 11, 2015   (JP) .............................. JP2015-180171

(51) Int. Cl.
*A63F 13/537*   (2014.01)
*A63F 13/69*    (2014.01)
*A63F 13/812*   (2014.01)

(52) U.S. Cl.
CPC ............ *A63F 13/537* (2014.09); *A63F 13/69* (2014.09); *A63F 13/812* (2014.09); *A63F 2300/5533* (2013.01); *A63F 2300/575* (2013.01)

(58) Field of Classification Search
CPC ....... A63F 13/537; A63F 13/69; A63F 13/812
See application file for complete search history.

(56) References Cited

U.S. PATENT DOCUMENTS 9,011,239 B2 *    4/2015   Ikeda ....................... A63F 13/69
                                                              463/29
2004/0242294 A1 *  12/2004  Shiozawa ............... A63F 13/10
                                                              463/9
2009/0075731 A1 *  3/2009   Kamiya .................. A63F 13/10
                                                              463/29

(Continued)

FOREIGN PATENT DOCUMENTS

CN           1384449 A      12/2002
CN           103341266 A    10/2013

(Continued)

OTHER PUBLICATIONS

Bateson87PES, myClub PES 2015 | How Agents Work! #3, Nov. 15, 2014, <https://www.youtube.com/watch?v=pTLsCNS3nnc> (Year: 2014).*

(Continued)

*Primary Examiner* — Chase E Leichliter
(74) *Attorney, Agent, or Firm* — HEA Law PLLC

(57) ABSTRACT

Provided is a game system including at least one processor configured to: receive a selection of at least one of a plurality of second objects each associated with one of a plurality of conditions for choosing a first object and one of a plurality of parameters that is used for choosing the first object satisfying the one of the plurality of conditions; notify a user by displaying information on a possibility that the first object satisfying the plurality of conditions respectively associated with the plurality of second objects is chosen, by using the plurality of parameters respectively associated with the plurality of second objects, when a selection of the plurality of second objects is received; and choose the first object satisfying the plurality of conditions by using the plurality of parameters.

10 Claims, 21 Drawing Sheets

(56) References Cited

U.S. PATENT DOCUMENTS

| | | | | |
|---|---|---|---|---|
| 2011/0312395 | A1* | 12/2011 | Nakamura | A63F 13/828 463/4 |
| 2013/0252689 | A1* | 9/2013 | Nashida | G07F 17/329 463/17 |
| 2014/0004947 | A1* | 1/2014 | Yamaguchi | A63F 13/10 463/31 |
| 2014/0349722 | A1* | 11/2014 | Nakatani | A63F 13/798 463/2 |
| 2014/0349723 | A1* | 11/2014 | Nakatani | A63F 13/798 463/9 |
| 2014/0364194 | A1* | 12/2014 | Kusano | A63F 13/35 463/22 |
| 2015/0024813 | A1* | 1/2015 | Yoneyama | A63F 13/65 463/3 |
| 2015/0127731 | A1* | 5/2015 | Hamada | H04L 67/22 709/204 |
| 2015/0141141 | A1* | 5/2015 | Suzuki | A63F 13/795 463/31 |

FOREIGN PATENT DOCUMENTS

| | | | |
|---|---|---|---|
| JP | 2014-012095 A | 1/2014 | |
| JP | 2014-239768 A | 12/2014 | |
| JP | 5676041 B1 | 2/2015 | |
| JP | 2015-223227 A | 12/2015 | |
| WO | WO-2013100220 A1 * | 7/2013 | A63F 13/12 |

OTHER PUBLICATIONS

Office Action dated Oct. 26, 2018, for corresponding CN Patent Application No. 201680051871.3 and computer generated English translation thereof.

English Translation of International Search Report for PCT/JP2016/069777 dated Sep. 13, 2016.

English Translation of Written Opinion of the International Searching Authority for PCT/JP2016/069777 accompanied with PCT/IB/373 and PCT/IB/338 dated Mar. 22, 2018.

* cited by examiner

TBL100

| PLAYER ID | NAME | INITIAL OVERALL VALUE | RARITY | LEAGUE AFFILIATION | NATIONALITY /REGION | POSITION | AGE | INITIAL ABILITY VALUE | | | |
|---|---|---|---|---|---|---|---|---|---|---|---|
| | | | | | | | | PASS | SHOOT | PHYSICAL ABILITY | DEFENSE |
| C0001 | ABC | 58 | WHITE | X LEAGUE | FRANCE, EUROPE | CENTER MIDFIELDER | 20 | 20 | 30 | 50 | 50 |
| ⋯ | ⋯ | ⋯ | ⋯ | ⋯ | ⋯ | ⋯ | ⋯ | ⋯ | ⋯ | ⋯ | ⋯ |

| INITIAL ABILITY VALUE | | | FOOTEDNESS | PLAY STYLE |
|---|---|---|---|---|
| SPEED | DRIBBLE | HEADING CAPABILITY | | |
| 45 | 30 | ⋯ | RIGHT | — |
| ⋯ | ⋯ | ⋯ | ⋯ | ⋯ |

FIG.14

TBL101

| SPECIALIST FIELD ID | SPECIALIST FIELD | CATEGORY |
|---|---|---|
| 001 | BLACK | RARITY |
| 002 | GOLD | RARITY |
| ⋮ | ⋮ | ⋮ |
| 005 | WHITE | RARITY |
| 006 | X LEAGUE | LEAGUE AFFILIATION |
| ⋮ | ⋮ | ⋮ |
| 015 | Z LEAGUE | LEAGUE AFFILIATION |
| 016 | EUROPE | NATIONALITY /REGION |
| ⋮ | ⋮ | ⋮ |

FIG.15

TBL102

| SCOUT ID | GRADE | CATEGORY | SPECIALIST FIELD ID |
|---|---|---|---|
| S0001 | 5 | NATIONALITY /REGION | 016 |
| S0002 | 5 | NATIONALITY /REGION | 017 |
| ⋮ | ⋮ | ⋮ | ⋮ |

FIG.16

| USER ID | PLAYER ID | SERIAL NUMBER | CURRENT OVERALL VALUE | CURRENT LEVEL | CURRENT PHYSICAL CONDITIONING | CURRENT ABILITY VALUE ||||||| |
|---|---|---|---|---|---|---|---|---|---|---|---|---|
| | | | | | | PASS | SHOOT | PHYSICAL ABILITY | DEFENSE | SPEED | DRIBBLE | CAPABILITY HEADING |
| U0001 | C0001 | 012 | 60 | 3 | NORMAL | 25 | 32 | 52 | 52 | 47 | 35 | ... |
| ..... | ..... | ..... | ..... | ..... | ..... | ..... | ..... | ..... | ..... | ..... | ..... | ..... |

TBL103

FIG.17

| USER ID | SCOUT ID | SERIAL NUMBER |
|---------|----------|---------------|
| U0001 | S0001 | 900 |
| U0001 | S0002 | 901 |
| ⋮ | ⋮ | ⋮ |

TBL104

GAME SYSTEM, GAME CONTROL DEVICE, AND INFORMATION STORAGE MEDIUM

CROSS-REFERENCE TO RELATED APPLICATION

The present disclosure contains subject matter related to that disclosed in Japanese Patent Application JP 2015-180171 filed in the Japan Patent Office on Sep. 11, 2015 and International Paten Application PCT/JP 2016/06977 filed in the Japan Patent Office or Jul. 4, 2016, the entire contents of which are hereby incorporated by reference.

BACKGROUND OF THE INVENTION

1. Field of the Invention

The present invention relates to a game system, a game control device, and an information storage medium.

2. Description of the Related Art

Hitherto, there has been known a game system configured so that an object, for example, a game item, is chosen. For example, in Japanese Patent No. 5676041, there is described a game system configured to set a probability of a game item being won for each of a plurality of game items and display the probability of each game item on a screen to execute lottery processing for determining whether or not the game item is won.

SUMMARY OF THE INVENTION

In the technology of Japanese Patent No. 5676041, a user can predict a possibility that a game item displayed on the screen can be obtained based on the probability of the game item being won. Regarding this point, hitherto, there have been game systems configured so that a game item is chosen based on a plurality of conditions (e.g., conditions such as game item attributes) relating to the game item selected by the user. However, in such game systems, before the game item is chosen, the user is not notified of information on the possibility that a game item satisfying the plurality of conditions is chosen. Therefore, the user cannot predict in advance the possibility that a game item satisfying the plurality of conditions relating to the game item selected by the user is chosen. As a result, the user cannot select the plurality of conditions in consideration of the possibility of a desired game item being obtained.

The present invention has been made in view of the above-mentioned problem. It is an object of the present invention to provide a game system, a game control device, and an information storage medium, which enable a user to select a plurality conditions in consideration of a possibility of a desired object being chosen.

In order to solve the above-mentioned problem, a game system according to one embodiment of the present invention includes at least one processor configured to: receive a selection of at least one of a plurality of second objects each associated with one of a plurality of conditions for choosing a first object and one of a plurality of parameters that is used for choosing the first object satisfying the one of the plurality of conditions; notify a user by displaying information on a possibility that the first object satisfying the plurality of conditions respectively associated with the plurality of second objects is chosen, by using the plurality of parameters respectively associated with the plurality of second objects, when a selection of the plurality of second objects is received; and choose the first object satisfying the plurality of conditions by using the plurality of parameters.

A game control device according to one embodiment of the present invention includes at least one processor configured to: receive a selection of at least one of a plurality of second objects each associated with one of a plurality of conditions for choosing a first object and one of a plurality of parameters that is used for choosing the first object satisfying the one of the plurality of conditions; notify a user by displaying information on a possibility that the first object satisfying the plurality of conditions respectively associated with the plurality of second objects is chosen, by using the plurality of parameters respectively associated with the plurality of second objects, when a selection of the plurality of second objects is received; and choose the first object satisfying the plurality of conditions by using the plurality of parameters.

BRIEF DESCRIPTION OF THE DRAWINGS

FIG. 6 is a diagram for illustrating an example of the scout list image obtained when a user has selected a scout.

FIG. 13 is a diagram for illustrating an example of a player master information table.

FIG. 14 is a diagram for illustrating an example of a specialist field information table.

FIG. 15 is a diagram for illustrating an example of a scout master information table.

FIG. 16 is a diagram for illustrating an example of a possessed player information table.

FIG. 17 is a diagram for illustrating an example of a possessed scout information table.

DETAILED DESCRIPTION OF THE INVENTION

Now, embodiments of the present invention are described with reference to the accompanying drawings. In the accompanying drawings, like components or corresponding components are denoted by like reference symbols, and repetitive descriptions may be omitted.

[1. Overall Configuration of Game System]

Figure 1:
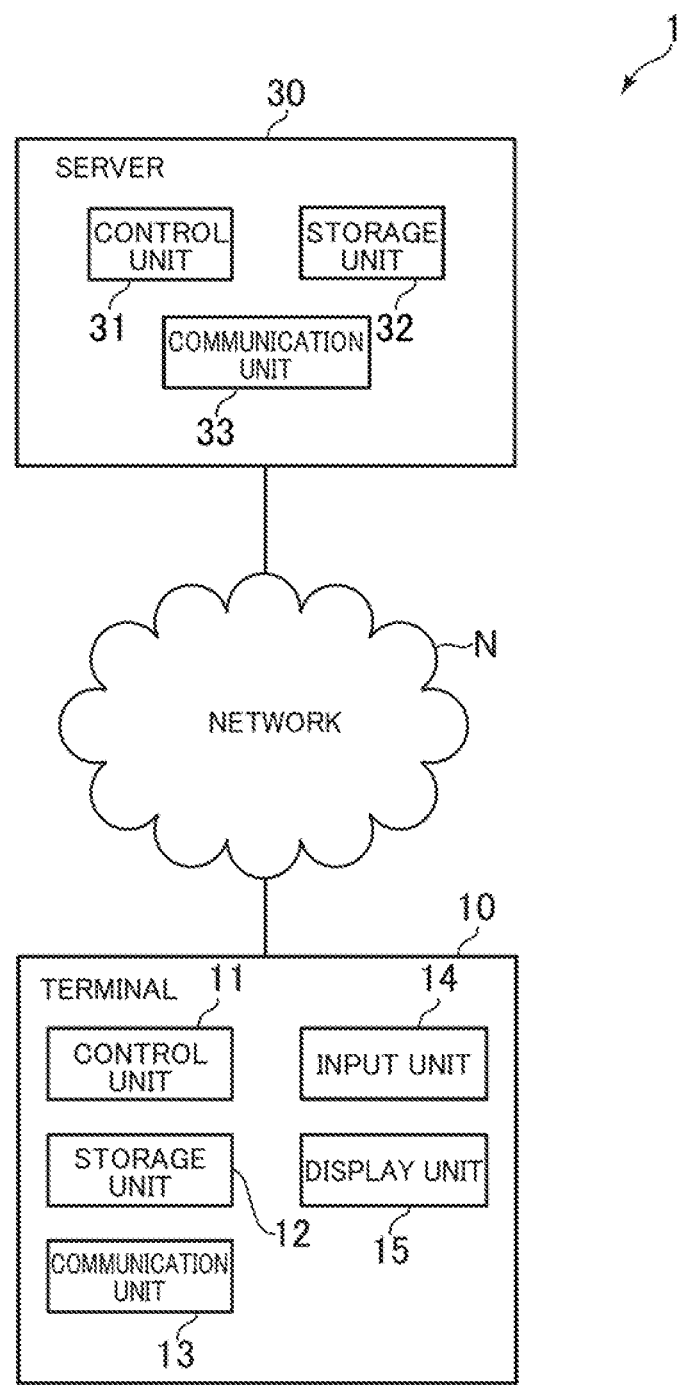
FIG. 1 is a diagram for illustrating an overall configuration of a game system according to an embodiment of the present invention.

FIG. 1 is a diagram for illustrating an overall configuration of a game system 1 according to an embodiment of the present invention. As illustrated in FIG. 1, the game system 1 includes a terminal 10, and a server 30 (an example of a game control device). The terminal 10 and the server 30 are connected to a network N. As a result, the terminal 10 and the server 30 are capable of performing data communication to/from each other.

The terminal 10 is a computer to be operated by a user. In this embodiment, the terminal 10 is a computer to be used by the user in order to play a game. For example, the terminal 10 is implemented by a mobile phone (including a smartphone), a portable information terminal (including a tablet computer), a consumer game machine (stationary game machine), a portable game machine, a commercial game machine installed in a store or similar premises, a desktop computer, or a laptop computer. As illustrated in FIG. 1, the terminal 10 includes a control unit 11, a storage unit 12, a communication unit 13, an input unit 14, and a display unit 15.

The control unit 11 includes, for example, at least one microprocessor. The control unit 11 executes processing in accordance with an operating system and other programs. The storage unit 12 includes a main storage unit (e.g., RAM) and an auxiliary storage unit (e.g., non-volatile semiconductor memory, hard disk drive, or solid-state drive), for example. The storage unit 12 is used for storing programs and data. The communication unit 13 includes a network interface, for example. The communication unit 13 performs data communication via the network N.

The input unit 14 includes, for example, an input device, such as a touch panel and buttons. The input unit 14 may also be used for performing input operations by the user via speech or gestures. The display unit 15 is, for example, a liquid crystal display panel or an organic EL display. The display unit 15 displays an image in accordance with instructions from the control unit 11. The input unit 14 and the display unit 15 may not be built into the terminal 10, or may be provided as external devices connected to the terminal 10.

The server 30 is a server computer. As illustrated in FIG. 1, the server 30 includes a control unit 31, a storage unit 32, and a communication unit 33. The hardware configurations of the control unit 31, the storage unit 32, and the communication unit 33 are the same as those of the control unit 11, the storage unit 12, and the communication unit 13, respectively.

The programs and the data described as being stored in the storage unit 12 or the storage unit 32 may be supplied to, for example, the terminal 10 or the server 30 via the network N. The terminal 10 or the server 30 may also include a component (e.g., optical disc drive or memory card slot) for reading programs or data stored in a computer-readable information storage medium (e.g., optical disc or memory card). The programs and data may also be supplied to the terminal 10 or the server 30 via the information storage medium.

[2. Outline of Game to be Executed by Game System]

The game system 1 executes a game configured so that a first object is chosen based on a second object. The "object" represents a thing that can be used (operated) in the game or a thing that can be selected in the game. For example, the "object" is a thing to be given to the user in the game, or a thing to be collected by the user. Specific examples of the "object" include a game card, a game character, and a game item. In this embodiment, the meaning of "object" includes a thing to be selected by the user, and hence as described later in detail in modification examples, an option, a button, and the like to be displayed on the display unit 15 are also considered to be examples of the "object". In this embodiment, a soccer game is used as an example to describe a case in which a player character is the first object and a scout for recruiting the player character is the second object. When the user operates the terminal 10 to activate the game, a menu image is displayed on the display unit 15.

Figure 2:
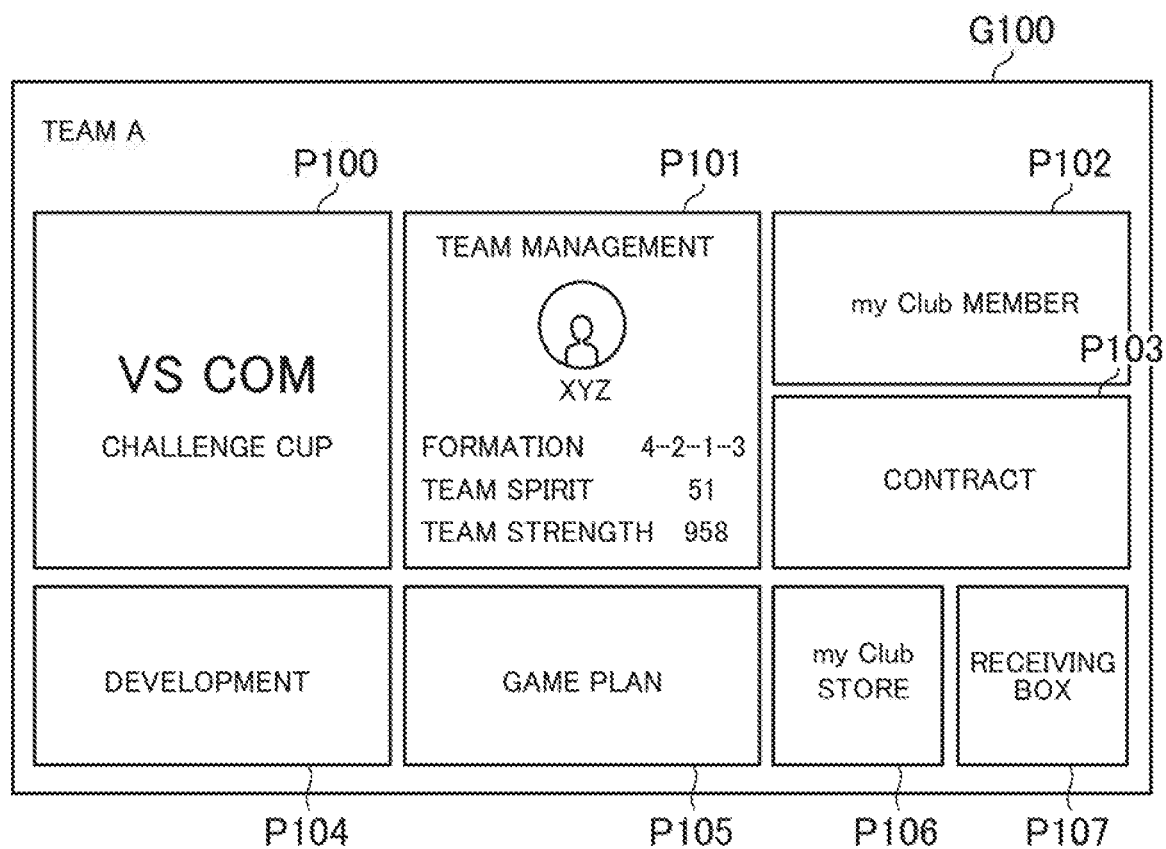
FIG. 2 is a diagram for illustrating an example of a menu image.

FIG. 2 is a diagram for illustrating an example of the menu image. As illustrated in FIG. 2, instruction objects P100 to P107 are displayed in a menu image G100. The "instruction objects" are, for example, images, symbols, or text associated with processing. Processing for performing a match between a user team including a plurality of player characters possessed by the user and an opposing team to be controlled by a computer is associated with the instruction object P100. After the user selects the instruction object P100, the user designates the player characters to appear in the match, a match strategy for the user team, and the like, and then the match starts. The match itself may be executed by various types of known processing. For example, the player characters may be operated by the user, or the actions of all of the player characters of the user team may be controlled by a computer. When the match ends, a match reward image for showing a reward acquired by the user is displayed on the display unit 15.

Figure 3:
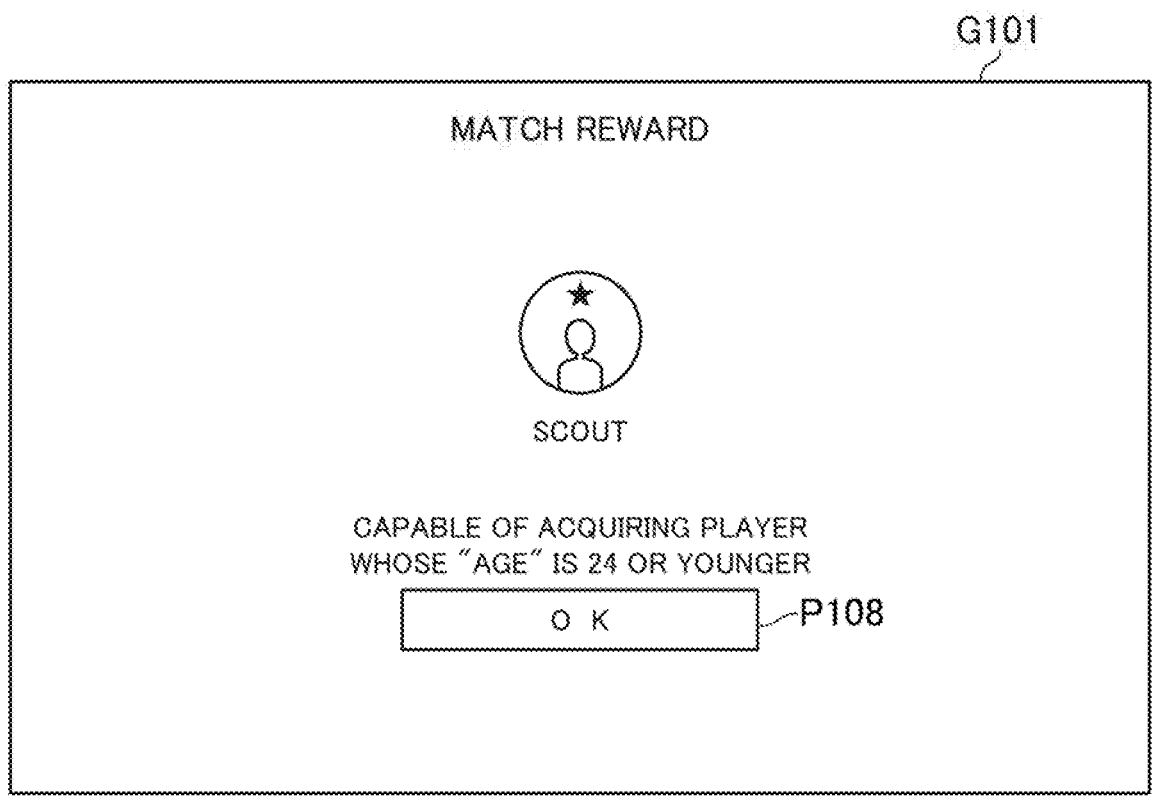
FIG. 3 is a diagram for illustrating an example of a match reward image.

FIG. 3 is a diagram, for illustrating an example of the match reward image. As illustrated in FIG. 3, the reward acquired by the user is displayed in a match reward image G101. The reward may be a game item or an in-game currency, but in this embodiment, a scout is given as the reward. The player characters that can be acquired change depending on the type of scout, which is described later in more detail. For example, in the example illustrated in FIG. 3, a scout capable of acquiring a player character whose "age" is 24 or younger is given as the reward. The scout to be given as the reward may be different depending on the match result or may be randomly determined regardless of the match result. When the user selects the instruction object P108, the display returns to the menu image G100.

Processing for changing a manager character of the user team and for changing the formation or the player characters to appear in the match is associated with the instruction object P101 of the menu image G100. The manager character is used in order to determine, for example, the formation of the user team. Processing for displaying information on the player characters of the user team is associated with the instruction object P102. The player character of the user team represents a player character that has been acquired by the user. Processing for acquiring player characters by the user is associated with the instruction object P103. Processing for developing the player characters of the user team is associated with the instruction object P104. Processing for determining the strategy and the like for the user team is associated with the instruction object P105. Processing for purchasing game items and the like is associated with the instruction object P106. Processing for receiving presents and the like from an administrator or another user is associated with the instruction object P107.

In this embodiment, when the user selects the instruction object P103, a player character can be acquired by using the scout acquired in the match. When the instruction object P103 is selected by the user, a contract image for acquiring a player character, for example, is displayed on the display unit 15.

Figure 4:
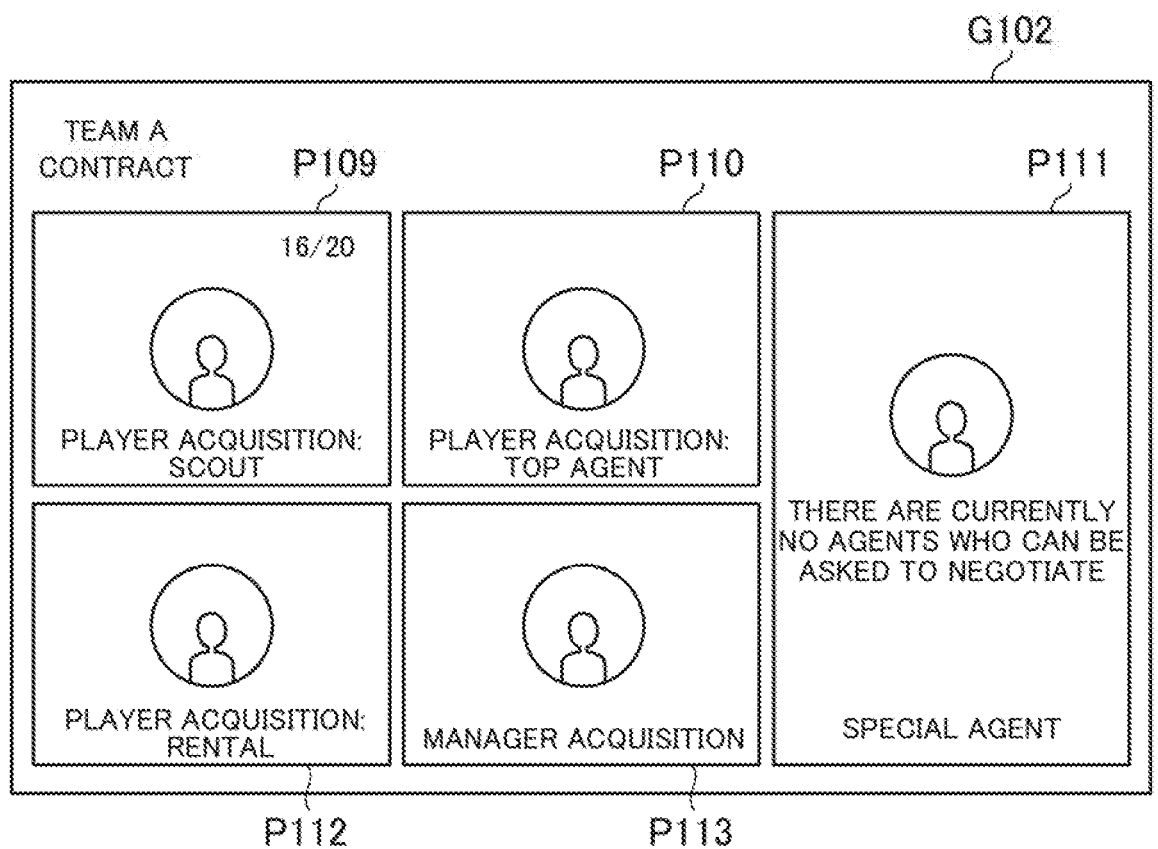
FIG. 4 is a diagram for illustrating an example of a contract image.

FIG. 4 is a diagram for illustrating an example of the contract image. As illustrated in FIG. 4, instruction objects P109 to P113 are displayed in a contract image G102. Processing for acquiring player characters by the user is associated with the instruction objects P109 to P112. Processing for acquiring a manager character by the user is associated with the instruction object P113. In this case, processing for acquiring a player character by using a scout is associated with the instruction object P109, and hence the processing performed when the instruction object P109 is selected by the user is described below. When the user selects the instruction object P109, a scout list image for selecting scouts is displayed on the display unit 15.

Figure 5:
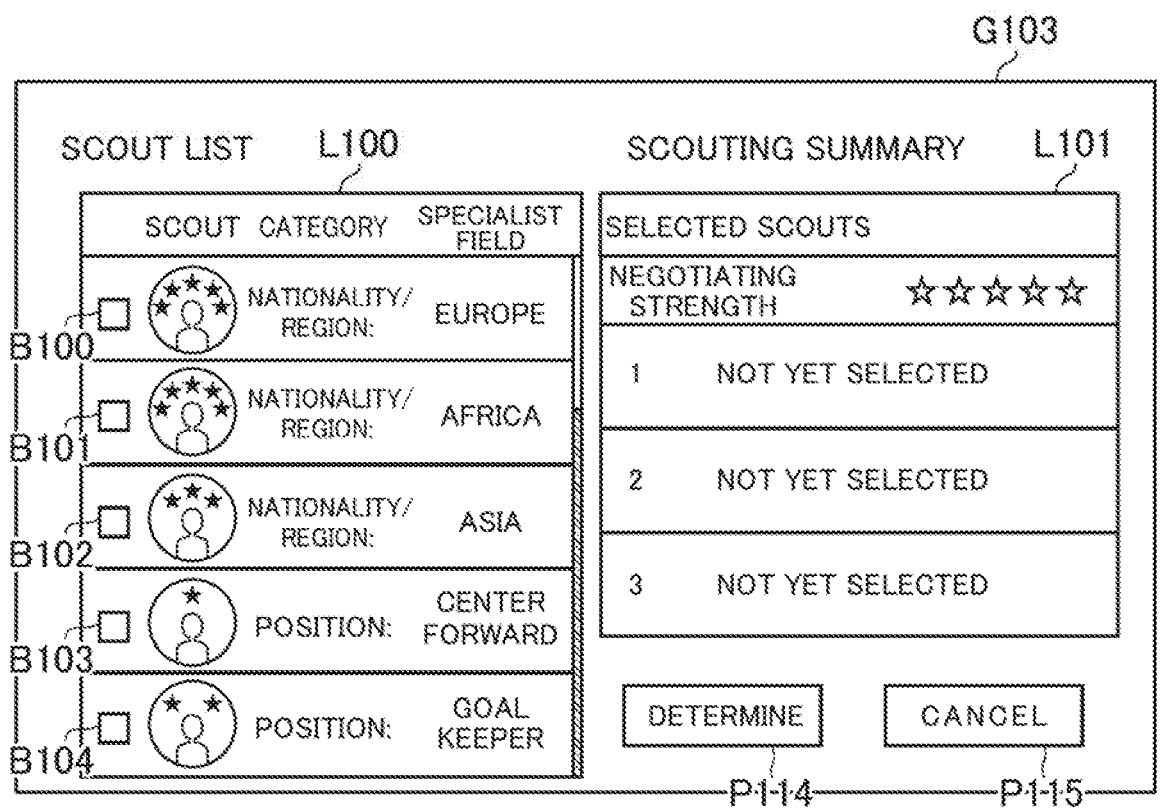
FIG. 5 is a diagram for illustrating an example of a scout list image.

FIG. 5 is a diagram for illustrating an example of the scout list image. As illustrated in FIG. 5, a list L100 of the scouts possessed by the user, checkboxes B100 to B104 for selecting scouts, and a list L101 of the scouts selected by the user are displayed in a scout list image G103.

The scouts acquired as a result of the user playing matches are displayed in the list L100. When the number of scouts possessed by the user is more than a maximum number (in FIG. 5, five scouts) of scouts that can be displayed in the list L100, the list L100 changes to a scrollable state, which allows any of the scouts possessed by the user to be selected. In the scout list image G103, only one scout may be selectable, or a plurality of scouts may for selectable. In this embodiment, a case in which the user selects three scouts is described.

In this embodiment, a grade (level) is set for each scout possessed by the user. The grade influences, for example, a probability of acquiring a desired player character. For example, there are five grades from "1" to "5", and one of those grades is set for each scout. A higher grade indicates a higher probability of acquiring a desired player character, and a lower grade indicates a lower probability of acquiring a desired player character. In the image example of FIG. 5, the grades of the respective scouts are indicated by the number of stars displayed in the list L100. For example, the grades of the scouts selectable in the checkboxes B100 to B104 are, in order, "5", "5", "3", "1", and "2".

As illustrated in the list L100, a specialist field for each category is set for each scout. The categories are used to classifying the specialist fields, and the specialist fields each indicate an attribute of an acquirable player character. An "attribute" represents a type, a characteristic, a nature, and the like of a player character. The attribute is indicated by an attribute value expressed in terns of, for example, a numerical value or a letter. The attributes are classified into categories in the same manner as the specialist fields. Examples or the categories include a "rarity", a "league affiliation", a "nationality/region", a "position", an "age", a "capability", a "footedness", and a "play style" of the player character.

The "rarity" category indicates how rare the player character is. One of a plurality of "rarity" levels is set for each player character. In this embodiment, the rarity is indicated not by a numerical value but by a color. In this case, the rarity and the type of color are associated with each other. For example, the rarity category includes five rarity levels, which are indicated by, in order from low to high, "white", "bronze", "silver", "gold", and "black". The "league affiliation" category indicates the soccer league with which the player character is affiliated from among a plurality of soccer leagues around the world. The "nationality/region" category indicates, from among a plurality of nationalities or regions, the nationality or region that the player character is from. The "position" category indicates the role of the player character in the game. One of a plurality of positions in soccer is set for each player character. The "age" category indicates the current age of the player character. The "capability" category indicates an ability (skill) of the player character. For each player character having a "capability", one of a plurality of types of ability is set. The "footedness" category indicates which foot the player character kicks with. "Left-footed" or "right-footed" is set for each player character. The "play style" category indicates the play style of the player character. For each player character having a "play style", one of a plurality of play styles is set. When a player character that is modeled on a real-world soccer player is used, the nationality or region, the team affiliation, the age, and the position of the soccer player in the real world are assigned. The ability values, skills, and the like are also assigned appropriately in accordance with the abilities and the like of the real-world soccer player.

For example, the scout selectable in the checkbox B100 is capable of acquiring player characters having "Europe" as their "nationality/region", and has a grade of "5", which is the highest. Therefore, the probability of acquiring a player character applicable to the scout is the highest among all the grades. The scout selectable in the checkbox B101 is capable of acquiring player characters having "Africa" as their "nationality/region", and has a grade of "5", which is the highest. Therefore, the probability of acquiring a player character applicable to the scout is the highest among all the grades. The scout selectable in the checkbox B102 is capable of acquiring player characters having "Asia" as their "nationality/region", and has a grade of "3". Therefore, the probability of acquiring a player character applicable to the scout is about the middle among all the grades. The scout selectable in the checkbox B103 is capable of acquiring player characters having "center forward" as their "position", and has a grade of "1", which is the lowest. Therefore, the probability of acquiring a player character applicable to the scout is the lowest among all the grades. The scout selectable in the checkbox B104 is capable of acquiring player characters having "goal keeper" as their "position", and has a grade of "2". Therefore, the probability of acquiring a player character applicable to the scout is slightly lower than the middle among all the grades. The user selects the scouts from the list L100 so that the attributes of the player character that he or she desires to acquire matches the specialist fields of the scouts, in consideration of the probability, which depends on the grades of the scouts.

Figure 6:
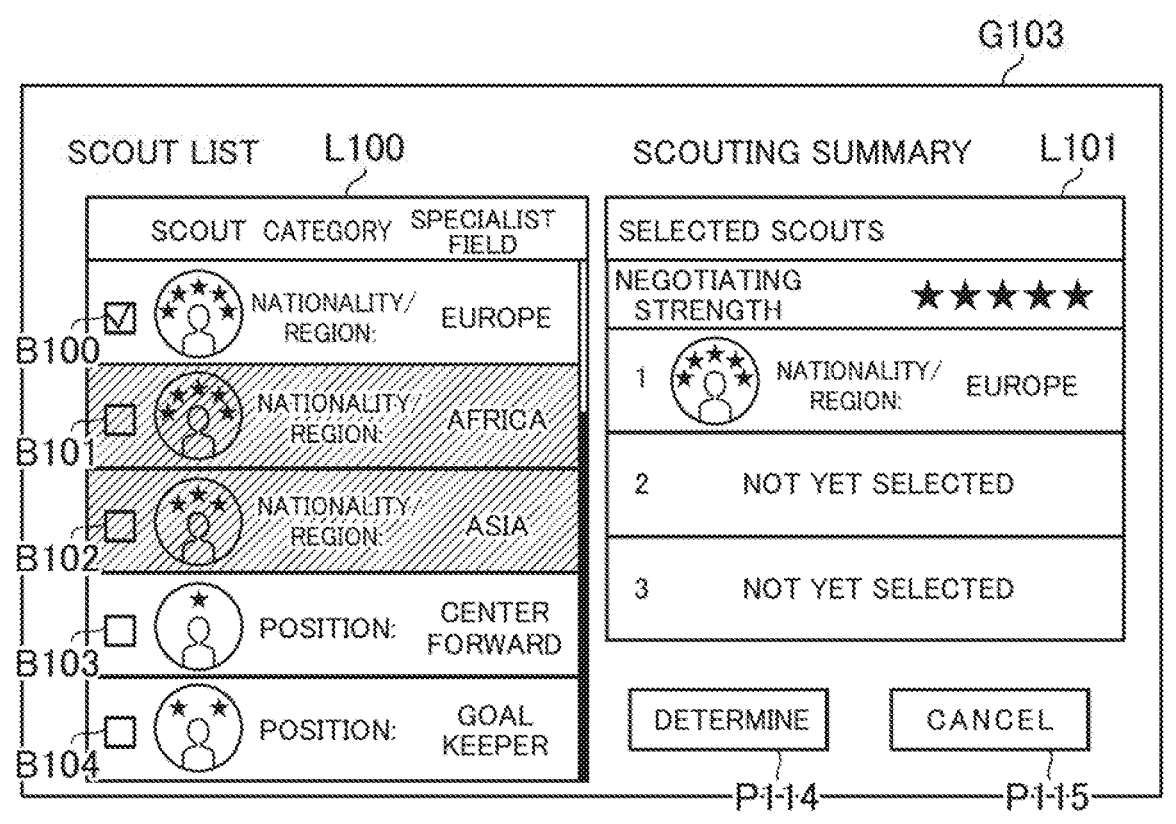

FIG. 6 is a diagram for illustrating an example of the scout list image obtained when the user has selected a scout. For example, when the user selects the checkbox B100, as illustrated in FIG. 6, the scout displayed alongside the checkbox B100 is displayed in the list L101 to be brought into a selected state. A negotiating strength determined based on the grades of the scouts selected by the user is displayed in the list L101 as the number of stars. The negotiating strength represents the probability of acquiring a player character haying an attribute that matches the specialist field of the scout selected by the user. In this example, the negotiating strength is determined by the average value of the grades of the scouts selected by the user. In FIG. 6, only one scout, who has a grade of "5", has been selected, and hence the grade of the selected scout itself is used as the negotiating strength. As a result, five stars are displayed in the list L101.

In this embodiment, scouts having a specialist field in the same category as a scout already selected by the user cannot be selected. In the image example of FIG. 6, the user has selected a scout having the category "nationality/region", and hence regions for showing scouts having a specialist field in the "nationality/region" category in the list L100 are grayed out, and checkboxes B101 and B102 cannot be selected. As a result, the user can select another two scouts having a specialist field in a category other than the "nationality/region" category.

Figure 7:
FIG. 7 is a diagram for illustrating an example of the scout list image obtained when the user has selected three scouts.

FIG. 7 is a diagram for illustrating an example of the scout list image obtained when the user has selected three scouts. As illustrated in FIG. 7, the three scouts selected by the user are displayed in the list L101. In the example of FIG. 7, a total of three scouts, namely, a scout who has the "nationality/region" of "Europe" as a specialist field and a grade of "5", a scout who has "footedness" of "right-footed" as a specialist field and a grade of "1", and a scout who has "play style" of "attack area: flank" and a grade of "1", are selected.

For example, the negotiating strength of those three scouts has a value calculated by rounding down the average grade of the scouts. As a result, the negotiating strength in the case of FIG. 7 is "2", and "2" stars are displayed in the list L101. The negotiating strength may be calculated by rounding up the average grade or rounding off the average grade instead of rounding down the average grade. As another example, a predetermined number of decimal places of the average grade may be left as it is without being rounded down.

Processing for moving to a next image is associated with an instruction object P114. Processing for returning to the contract image G102 is associated with an instruction object P115. When the user selects the instruction object P114 after having selected three scouts, a confirmation image for confirming the probability of acquiring a desired player character is displayed on the display unit 15.

Figure 8:
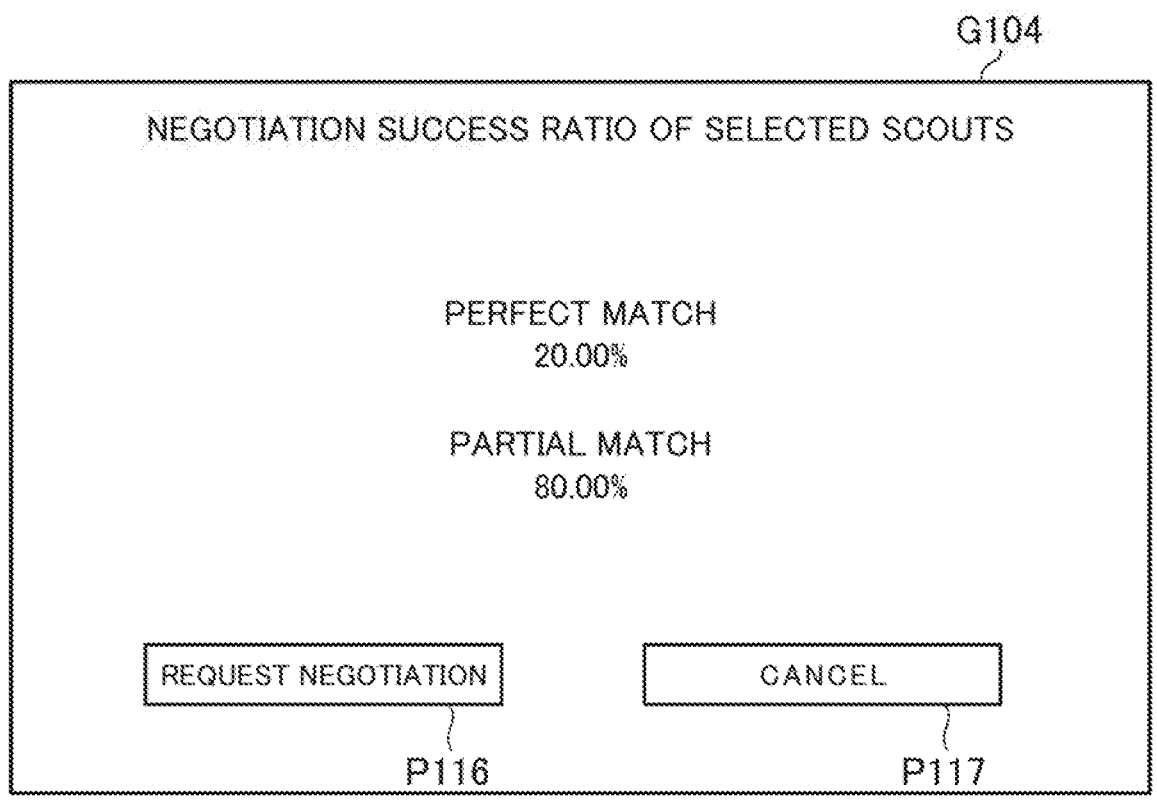
FIG. 8 is a diagram for illustrating an example of a confirmation image.

FIG. 8 is a diagram for illustrating an example of the confirmation image. As illustrated in FIG. 8, the probability of acquiring a player character having an attribute that matches the specialist field of each scout selected by the user is displayed in a confirmation image G104. In this example, three scouts are selected, and hence "20.00%", which is the probability of matching all three specialist fields (written as "PERFECT MATCH" in FIG. 8), and "80.00%", which is the probability of matching one or two of the specialist fields (written as "PARTIAL MATCH" in FIG. 8) are displayed in the confirmation image G104.

The probability of a perfect match is determined based on the negotiating strength of the scouts selected by the user. A higher negotiating strength means that the probability of a perfect match is higher, and a lower negotiating strength means that the probability of a perfect match is lower. For example, a probability of "(negotiating strength)×10%" is set as the probability of a perfect match. In this example, the negotiating strength of the three scouts is "2", and hence the probability of a perfect match is "20.00%". In this embodiment, a player character matching at least one specialist field of each scout selected by the user can always be acquired. For this reason, the total value of the probability of a perfect match and the probability of a partial match is 100%.

Processing for moving to a next image is associated with art instruction object P116. Processing for returning to the scout list image G103 is associated with an instruction object P117. When the user selects the instruction object P116, the three scouts selected by the user are expended, with the result that the player character to be acquired is determined based on the probabilities displayed in the confirmation image G104, and an acquisition image for showing the determined player character is displayed on the display unit 15.

Figure 9:
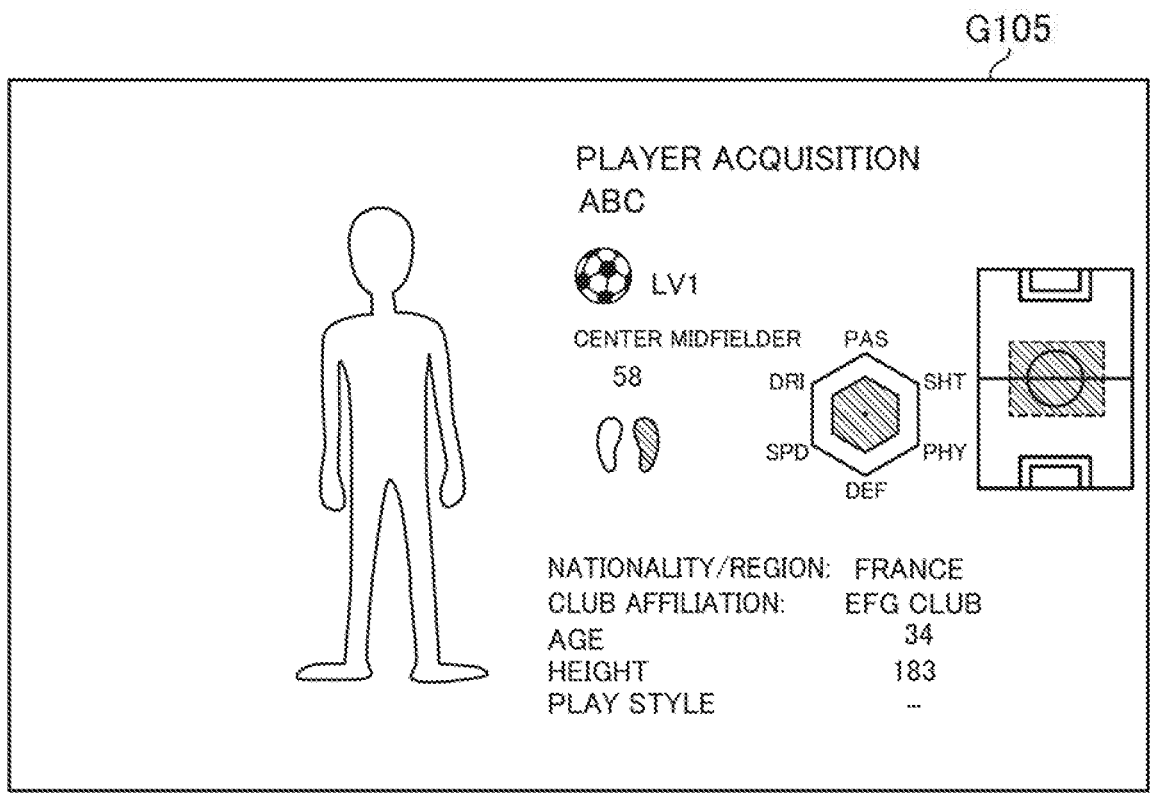
FIG. 9 is a diagram for illustrating an example of an acquisition image.

FIG. 9 is a diagram for illustrating an example of the acquisition image. As illustrated in FIG. 9, the player character acquired by the user is displayed in an acquisition image G105. For example, the player character illustrated in FIG. 9 is from "France", which is included in "nationality/region" of "Europe", and has a "footedness" of "left-footed", but the "play style" has not been set in particular. For this reason, a player character that matches two of the specialist fields of the three scouts selected by the user has been acquired. In other words, as a result of player character lottery based on a probability of a perfect match of "20.00%", a player character perfectly matching those conditions has been missed out, but a player character matching two of those conditions (specialist fields) has been chosen. As illustrated in FIG. 9, the rarity, the level, the position, the ability value, the age, the height, and the like of the player character are also displayed in the acquisition image G105. In this embodiment, the rarity of the player character is indicated not by a numerical value but by a color, and hence the rarity may be indicated by the color of a ball image displayed to the left of and adjacent to the level.

As described above, the probability of a perfect match is determined based on the negotiating strength of the three scouts selected by the user. Therefore, when the user selects a different combination of scouts, the probability of a perfect match also changes.

Figure 10:
FIG. 10 is a diagram for illustrating an example of the scout list image obtained when a combination different from that of FIG. 7 is selected.

FIG. 10 is a diagram for illustrating an example of the scout list image G103 obtained when a combination different from that of FIG. 7 is selected. In the example of FIG. 10, there is illustrated a case in which the user has selected two scouts having a grade of "1", and one scout having a grade of "2". As described above, in this embodiment, the negotiating strength is calculated by rounding off the average grade. Therefore, as shown in the list 101, the negotiating strength of the three scouts is "1".

Figure 11:
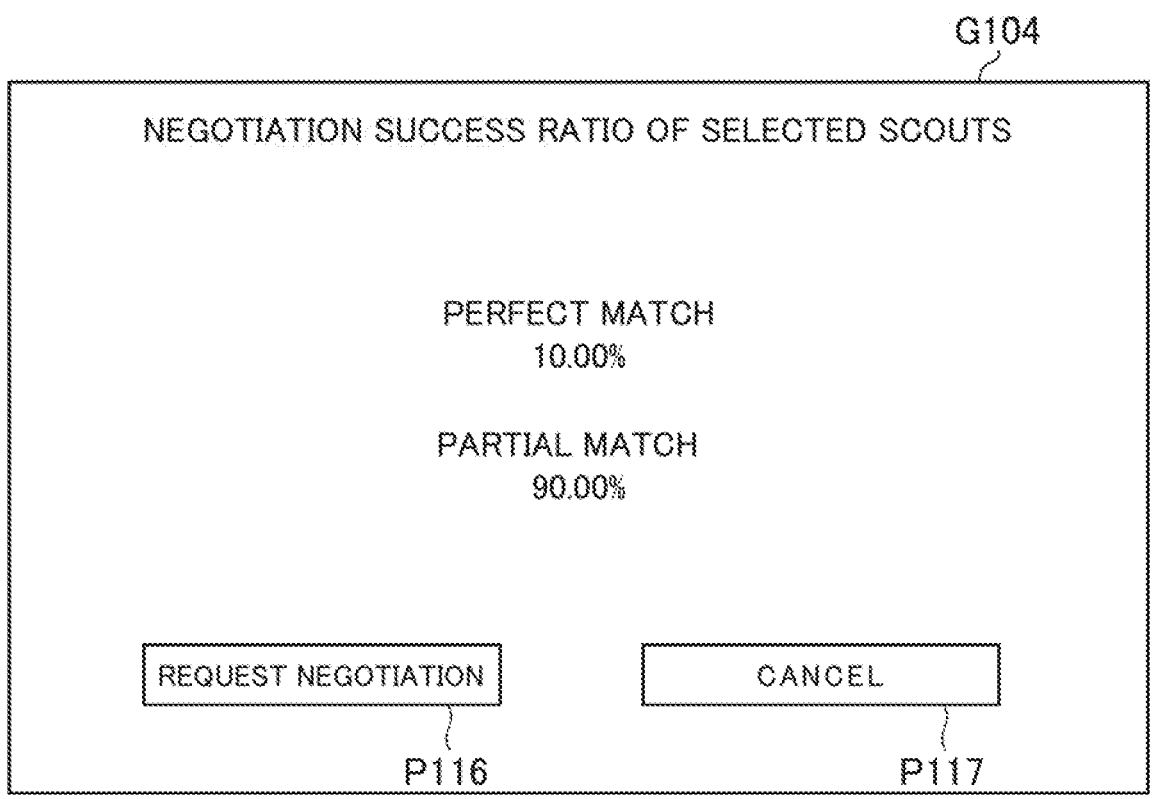
FIG. 11 is a diagram for illustrating an example of the confirmation image obtained when a negotiating strength of the scouts is "1".

FIG. 11 is a diagram for illustrating an example of the confirmation image G104 obtained when the negotiating strength of the scouts is "1". As illustrated in FIG. 11, when the negotiating strength is "1", the probability of a perfect match is "10.00",which is lower than when the negotiating strength is "2". As described above, the total value of the probability of a perfect match and the probability of a partial match is 100%, and hence in FIG. 11, the probability of a partial match is 90%.

In this way, in the game system 1, the probability of a perfect match and the probability of a partial match, which change depending on the negotiating strength of the scouts, are displayed in the confirmation image G104, which allows the user to select a plurality of scouts in consideration of the possibility of a desired player character being chosen. The above-mentioned processing is described below in detail.

[3. Functions to be Implemented by Game System]

Figure 12:
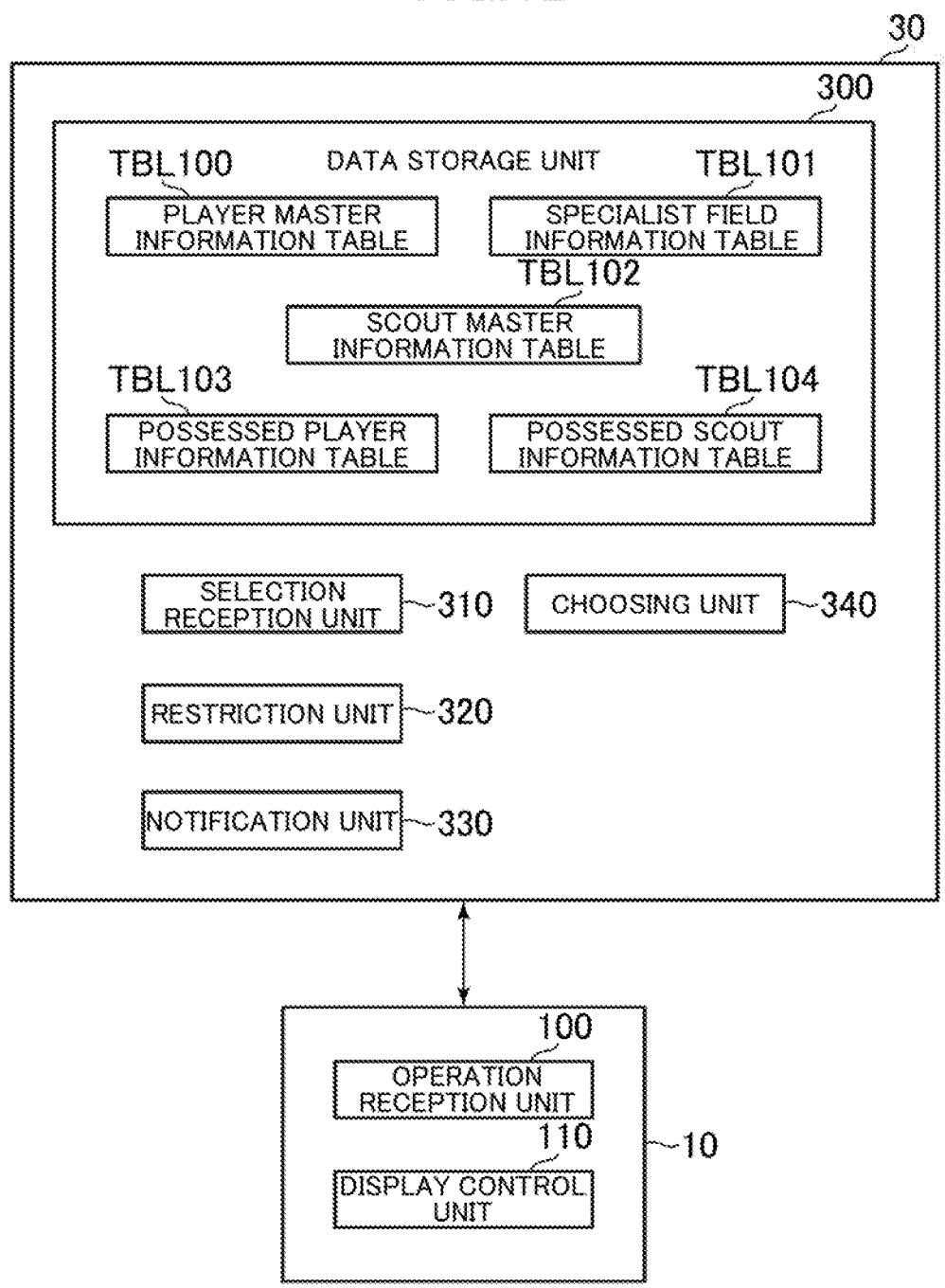
FIG. 12 is a function block diagram for illustrating functions relating to the present invention among the functions implemented by the game system.

FIG. 12 is a function block diagram for illustrating functions relating to the present invention among the functions implemented by the game system 1.

[3-1. Functions to be Implemented by Server]

First, the functions to be implemented by the server 30 are described. In this embodiment, there is described a case in which the main functions of the game system 1 are implemented by the server 30. As a result, a data storage unit 300, a selection reception unit 310, a restriction unit 320, a notification unit 330, and a choosing unit 340 are implemented by the server 30.

[3-1-1. Data Storage Unit]

The data storage unit 300 is mainly implemented as the storage unit 32. The data storage unit 300 stores various data required for executing the game. In this case, as an example of the data stored by the data storage unit 300, a player master information table TBL 100, a specialist field information table TBL 101, a scout master information table TBL 102, a possessed player information table TBL 103, and a possessed scout information table TBL 104 are described.

FIG. 13 is a diagram for illustrating an example of the player master information table TBL 100. As illustrated in FIG. 13, the player master information table TBL 100 is a data table for storing basic information on the player characters. For example, information on the "name", "initial overall value", "rarity", "league affiliation", "nationality/region", "position", "age", "initial ability value", "footedness", "play style", and the like of each player character is stored in the player master information table TBL 100 in association with a "player ID" uniquely identifying each player character. In this embodiment, those pieces of information associated with the "player ID" correspond to the attributes of the player characters, and the values representing the pieces of information correspond to the attribute values.

The overall value represents the level of a plurality of ability values as a single number in an overall manner. The overall value is calculated by substituting the ability values into a predetermined expression. The ability values include a plurality of items. In the example of FIG. 13, the ability values include seven items, namely, "pass", "shoot", "physical ability", "defense", "speed", "dribble", and "capability". The numbers for "pass", "shoot", "physical ability", "defense", "speed", and "dribble" each indicate the level of the ability. For example, a higher number may indicate a higher level of ability. The "capability" item indicates a skill that the player character has acquired. The "play style" stores the play style that the player character has.

FIG. 14 is a diagram for illustrating an example of the specialist field information table TBL 101. As illustrated in FIG. 14, the specialist field information table TBL 101 is a data table in which the specialist field set for each scout and the category type of the specialist field are defined. For example, information on the "specialist field", which indicates the details of the specialist field, and the "category", to which the specialist field belongs, is stored in the specialist field information table TBL 101 in association with a "specialist field ID" uniquely identifying the specialist field.

FIG. 15 is a diagram for illustrating an example of the scout master information table TBL 102. As illustrated in FIG. 15, the scout master information table TBL 102 is a data table for storing basic information on the scouts. For example, information on the "grade" and the "specialist field ID" of each scout is stored in the scout master information table TBL 102 in association with a "scout ID" uniquely identifying each scout.

FIG. 16 is a diagram for illustrating an example of the possessed player information table TBL 103. As illustrated in FIG. 16, the possessed player information table TBL 103 is a data table for storing various kinds of information on the player characters possessed by the user. For example, information on the "player ID" of each of the player characters possessed by the user, a "serial number" uniquely identifying each individual player character, and a "current overall value", a "current level", a "current physical conditioning", a "current ability value", and the like of each of the player characters is stored in the possessed player information table TBL 103 in association with the "user ID" uniquely identifying the user. The physical conditioning represents the state of the player character.

When the user possesses a plurality of the same player character, those player characters have the same "player ID", but have different "serial numbers". The serial number is a number issued when the player character is given to the user in order to enable the player character to be identified. Each of the player characters may also be identified based on a pair of the player ID and the serial number, instead of only the serial number by itself. The "current level" of each of the player characters changes in accordance with, for example, the development of the player character and match results. The "current overall value" and the "current ability value" also change together with the change in the "current level". As a result, the "current overall value" and the "current ability value" stored in the possessed player information table TBL 103 may be different from the initial values stored in the player master information table TBL 100.

FIG. 17 is a diagram for illustrating an example of the possessed scout information table TBL 104. As illustrated in FIG. 17, the possessed scout information table TBL 104 is a data table for storing various kinds of information on the scouts possessed by the user. For example, information on the "scout ID" of each of the scouts possessed by the user and a "serial number" uniquely identifying each individual scout is stored in the possessed scout information table TBL 104 in association with the "user ID". The serial number has the same meaning as that for the player character. When the user possesses a plurality of the same scouts, those scouts have the same "scout ID", but have different "serial numbers".

The data to be stored in the data storage unit 300 is not limited to the examples described above. The data storage unit 300 may store any data that is required for executing the game. For example, the data storage unit 300 may store a data table for storing, of the player characters possessed by the user, the player characters that are to appear in the game and various kinds of information on the user. As another example, the data storage unit 300 may store a data table for defining all of the attributes of the player characters prepared in the game and the categories thereof. As yet another example, the data storage unit 300 can store basic information on a manager or data on a manager character or similar character possessed by the user.

[3-1-2. Selection Reception Unit]

The selection reception unit 310 is mainly implemented by the control unit 31. The selection reception unit 310 receives a selection of at least one scout each associated with a condition for choosing a player character and a parameter that is used for choosing a player character satisfying the condition. For example, the selection reception unit 310 receives a selection of at least one scout from among the scouts displayed in the list L100 of the scout list image G103. In this embodiment, there is described a case in which the selection reception unit 310 is implemented by the server 30, and hence reception of data representing a scout selected by the user from the terminal 10 corresponds to the receiving of the selection of the scout.

The "condition" is a condition that is used for choosing a player character. For example, the "condition" is a condition relating to information on the player characters. For example, a range of values indicated by information on a player character corresponds to the "condition". In the case of an attribute value that represents an attribute of the player characters, for example, the fact that a player character has a predetermined attribute corresponds to the condition. For example, the "condition" is divided into categories. The "condition" can be said to relate to at least one of a plurality of categories. In this case, the "category" can be said to be a group for classifying conditions. For example, when the "condition" is an attribute of the player characters, the "category" can be said to be a category for classifying attributes. In other words, a plurality of attributes are included in each category. In this embodiment, the player characters have at least one attribute from among a plurality of attribute types, and hence the "condition" is having a specific attribute from among those plurality of attribute types. In other words, the specialist field of the scouts corresponds to the "condition".

The "parameter" of this embodiment is a parameter to be referred to when a player character is to be chosen. The "parameter" is a predetermined type of parameter that is associated with the scouts. For example, the "parameter" represents an attribute of the player characters or the scouts. As another example, the "parameter" is a parameter representing an ability of the scouts. In this embodiment, the player characters are chosen by using scouts, and hence the "parameter" can be said to represent an ability of the scouts for choosing the player characters. In other words, in this embodiment, the scouts search for player characters being sports people in the game, and hence the "parameter" can be said to be a parameter representing an ability of the scouts to search for sports people. In this embodiment, the grade of the scouts corresponds to the "parameter".

[3-1-3. Restriction Unit]

The restriction unit 320 is mainly implemented by the control unit 31. The restriction unit 320 restricts the execution of processing for choosing a player character based on a plurality of conditions relating to the same category. In other words, the restriction unit 320 permits the execution of processing for choosing a player character based on a plurality of conditions relating to categories different from each other, and prohibits the execution of processing for choosing a player character based on a plurality of conditions relating to the same category. In this embodiment, a match with the specialist fields of the scouts corresponds to the condition, and hence the restriction unit 320 restricts the execution of processing for choosing a player character based on a plurality of specialist fields of the same category.

In this case, the term "restrict" refers to inhibiting a player character from being chosen. For example, the term "restrict" means that the scouts are inhibited from being selected by the user. For example, disabling an input form including a checkbox and a radio button corresponds to the inhibiting the scouts from being selected by the user. As another example, the term "restrict" means not inhibiting the user from selecting the scouts but not executing the choosing processing based on the selected scouts. For example, the term "restrict" means not calculating the probabilities based on the selected scouts, or calculating the probabilities but not executing the choosing processing based on those probabilities.

[3-1-4. Notification Unit]

The notification unit 330 is mainly implemented by the control unit 31. When the selection of the plurality of scouts is received by the selection reception unit 310, the notification unit 330 notifies information on the possibility that a player character satisfying a plurality of conditions respectively associated with the plurality of scouts is chosen, by using a plurality of grades respectively associated with the plurality of scouts.

The term "information on the possibility" refers to information enabling identification of the possibility that a player character satisfying a plurality of conditions is chosen. For example, the "information on the possibility" is the existence/non-existence of the possibility of a player character being chosen, or the probability that a player character satisfying the condition is chosen. The probability is represented within the range of from 0% to 100%. The "information on the possibility" may be information for directly notifying the possibility or indirectly notifying the possibility. In this case, "directly notifying" refers to displaying a symbol representing the existence/non-existence per se of the possibility, or displaying a number representing the probability per se, and "indirectly notifying" refers to suggesting the possibility or probability instead of indicating the possibility or probability per se. Examples of "indirectly notifying" may include indicating the level of the existence/non-existence of the possibility of a player character being chosen or the probability that a player character satisfying the condition is chosen based on the number of images such as stars or symbols such as "circles", or based on a display mode of an image. For example, a larger number of images or symbols may indicate the existence of a possibility or that the probability is higher. As another example, a larger sized image, a brighter image, or a more strongly colored image may indicate the existence of a possibility or that the probability is higher. In this embodiment, there is described a case in which the "information on the possibility" to be notified by the notification unit 330 is the probability that a player character satisfying a plurality of conditions is chosen.

The term "notify" refers to outputting information. For example, the term "notify" may be displaying a predetermined image or outputting a predetermined sound. In such a case, the term "notify" means displaying an image for showing information relating to the possibility or outputting a sound representing information relating to the possibility.

The notification unit 330 acquires the probability of a player character being chosen based on each grade of the plurality of scouts. In this embodiment, there is described a case in which a simple average value of the grades of the respective scouts is used. However, a weighted average may be used, or a value obtained by substituting the grades of the respective scouts into a predetermined expression may be used. For example, an association between the average value of the grades (i.e., negotiating strength) and the probability is stored in advance in the data storage unit 300. The association may be in the form of an expression or may be in the form of a table. In this embodiment, as described above, the association is the expression "(negotiating strength×10%)". The notification unit 330 acquires the probability associated with the average value of the grades of the respective scouts (i.e., negotiating strength).

In this embodiment, the notification unit 330 notifies information on the possibility that a player character satisfying all of the plurality of conditions is chosen. In this case, the wording "satisfying all of the conditions" means matching all of the plurality of conditions, namely, matching n conditions when n (n is an integer of 2 or more) represents the number of conditions. For example, when the conditions are attributes, this means a match with all of the attributes.

In this embodiment, the notification unit 330 displays the probability of a perfect match in the confirmation image G104.

In this embodiment, the notification unit 330 further notifies information on the possibility that a player character satisfying a part of the plurality of conditions is chosen. In this case, the wording "satisfying a part of the conditions" means matching one or more and less than n-1 conditions. In this embodiment, the notification unit 330 displays the probability of a partial match in the confirmation image G104.

[3-1-5. Choosing Unit]

The choosing unit 340 is mainly implemented by the control unit 31. The choosing unit 340 chooses a player character satisfying the plurality of conditions by using the grades of the plurality of scouts. The choosing unit 340 executes lottery processing of the player characters based on the probabilities depending on the grades of the respective scouts. The method of acquiring the probabilities is the same as the method described for the notification unit 330. The lottery processing is processing for determining whether or not a player character satisfying the conditions is to be successfully chosen. When it is determined that a player character satisfying the conditions is to be successfully chosen, the choosing unit 340 refers to the player master information table TBL 100 to identify player characters matching the conditions. For example, the choosing unit 340 identifies player characters matching at least one of the specialist fields of the scouts. When there are a plurality of player characters satisfying the conditions, the choosing unit 340 chooses at least one of those player characters. The choosing method may be a method determined in advance. For example, the method may be a random choosing method, or may be a method in which a player character not possessed by the user is chosen.

In this embodiment, when no player characters satisfying all of the plurality of conditions are chosen, the choosing unit 340 chooses a player character satisfying a part of the plurality of conditions. More specifically, the choosing unit 340 determines, based on the probabilities depending on the grades of the respective scouts, whether or not a player character that is a perfect match is to be successfully chosen. When it is determined that such a player character is not to be successfully chosen, the choosing unit 340 refers to the player master information table TBL 100 to identify player characters satisfying a part of the plurality of conditions, When there are a plurality of player characters satisfying a part of the conditions, the choosing unit 340 chooses at least one of those player characters. The choosing method may be, as described above, a method determined in advance.

[3-2. Functions to be Implemented by Terminal]

Next, the functions to be implemented by the terminal 10 are described. As illustrated in FIG. 12, the terminal 10 includes an operation reception unit 100 and a display control unit 110.

[3-2-1. Operation Reception Unit]

The operation reception unit 100 is mainly implemented by the control unit 11. The operation reception unit 100 receives various operations performed by the user using the input unit 14. The operation reception unit 100 transmits data representing the details of the received operations to the server 30 by using the communication unit 13.

[3-2-2. Display Control Unit]

The display control unit 110 is mainly implemented by the control unit 11. The display control unit causes the display unit 15 to display various images on the display unit 15. For example, the display control unit 110 causes the display unit 15 to display the various images based on data received from the server 30. In this embodiment, the display control unit 110 causes the display unit 15 to display the menu image G100, the match reward image G101, the contract image G102, the scout list image G103, the confirmation image G104, and the acquisition image G105.

[4. Processing to be Executed in Game System]

Figure 18:
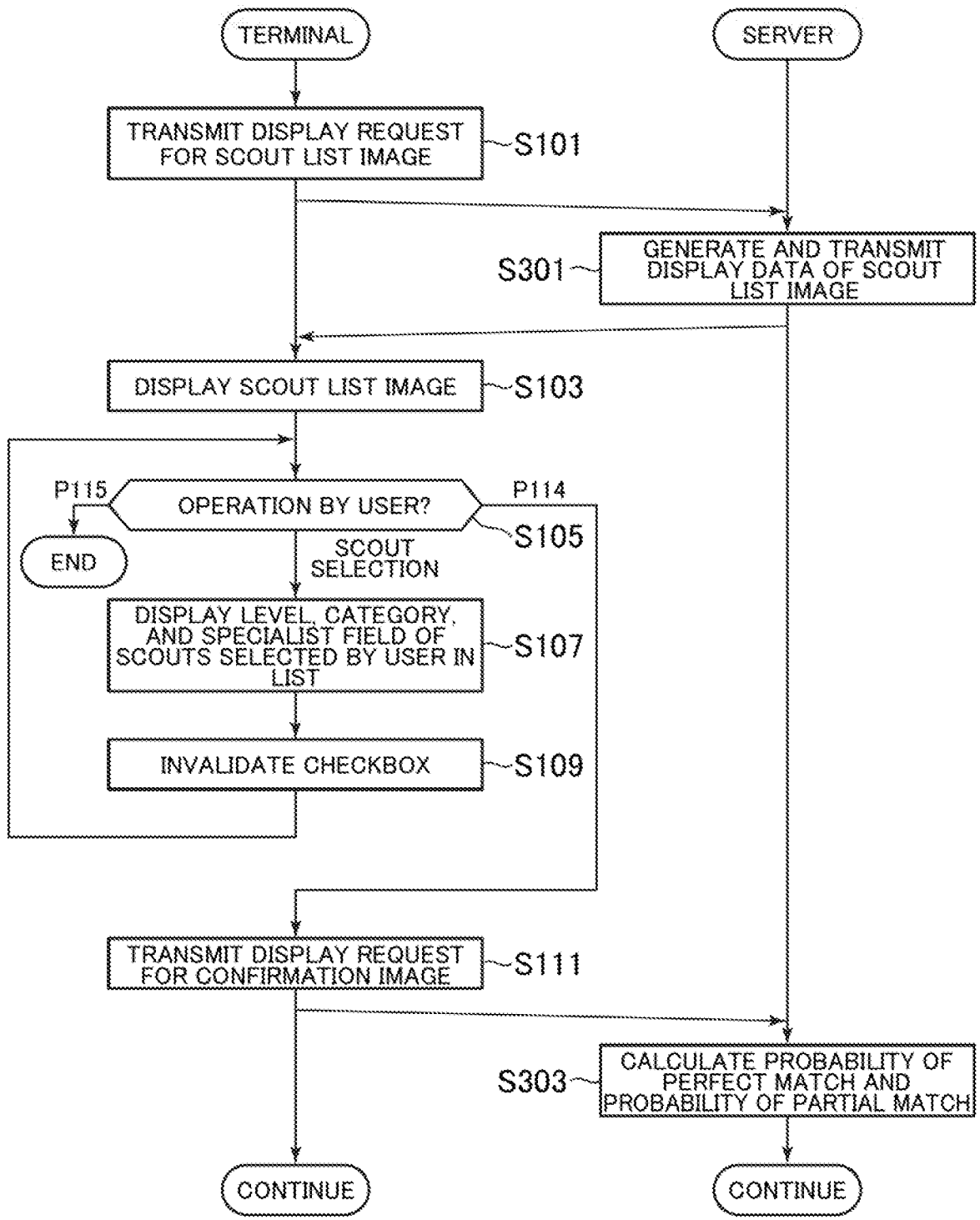
FIG. 18 is a flowchart for illustrating processing to be executed by the game system.
Figure 19:
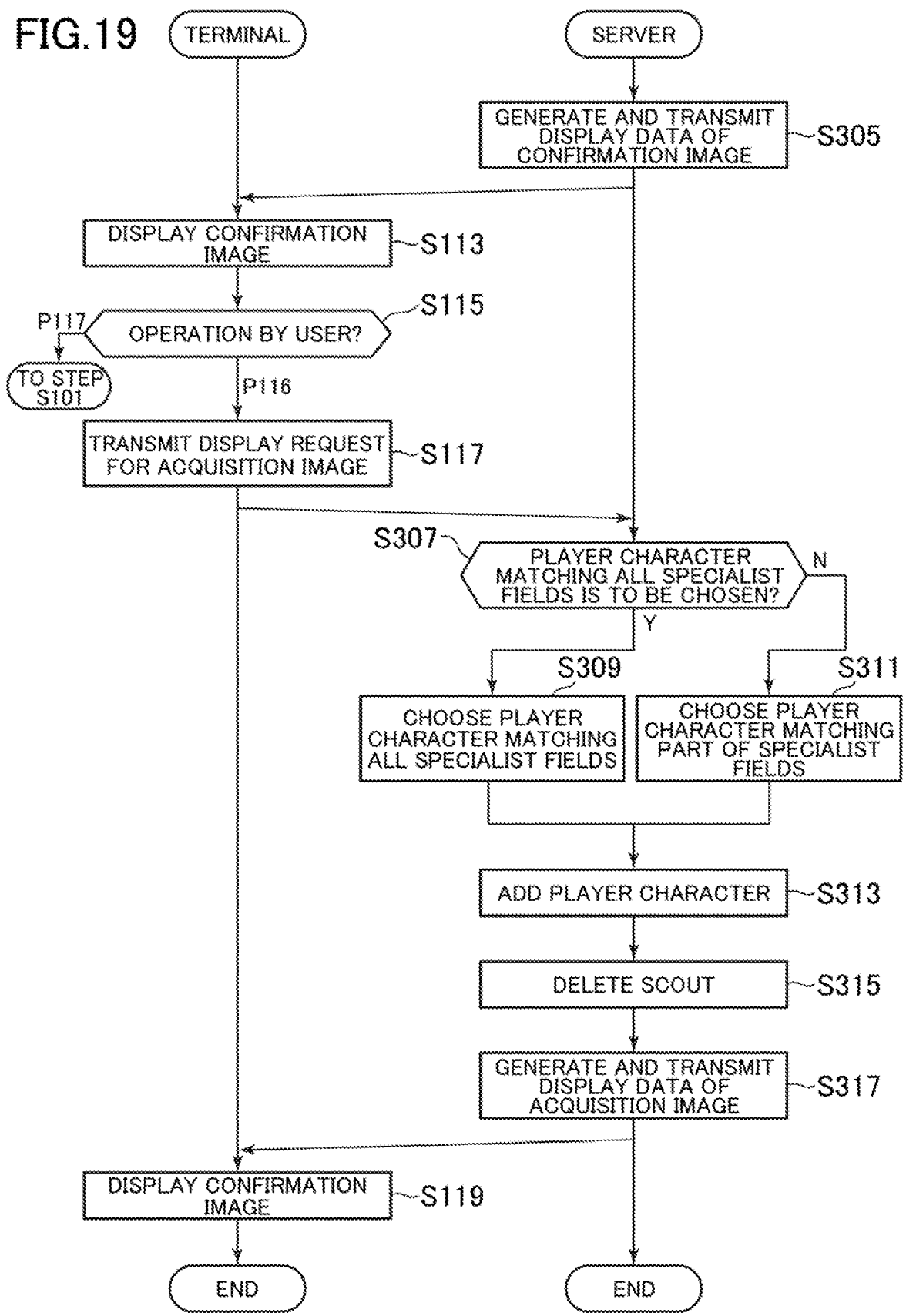
FIG. 19 is a flowchart for illustrating processing to be executed by the game system.

FIG. 18 and FIG. 19 are flowcharts for illustrating processing to be executed by the game system 1. The processing illustrated in FIG. 18 and FIG. 19 is executed by the control unit 11 based on programs stored in the storage unit 12 and by the control unit 31 based on programs stored in the storage unit 32. The function blocks illustrated in FIG. 12 are implemented through execution of the processing described below. The processing described in this case is executed when the instruction object P109 has been selected in a state in which the contract image G102 illustrated in FIG. 4 is displayed on the display unit 15.

As illustrated in FIG. 18, first, in the terminal 10, when the instruction object P109 is selected, the control unit 11 transmits a display request for the scout list image G103 to the server 30 (Step S101). The display request may be transmitted in a predetermined data format including information for identifying the image to be displayed. When data is to be transmitted to the server 30 from the terminal 10, the user ID and an IP address of the terminal 10, for example, are also transmitted, which enables the server 30 to identify from which terminal 10 the data is received.

In the server 30, when the display request is received, the control unit 31 refers to the specialist field information table TBL 101, the scout master information table TBL 102, and the possessed scout information table TBL 104 to generate display data of the scout list image G103, and transmits the generated display data to the terminal 10 (Step S301). In Step S301, the control unit 31 refers to a record associated with the user ID of the user who has issued the display request to identify the scouts possessed by the user. The control unit 31 then identifies the grade, the category, and the specialist field of those scouts, and generates display data of the scout list image G103. The display data may be in any predetermined data format, for example, an HTML format. The serial number, the grade, the category, and the specialist field of each scout displayed in the list L100 are also transmitted together with the display data of the scout list image G103.

In the terminal 10, when the display data is received, the control unit 11 causes the display unit 15 to display the scout list image G103 (Step S103). The control unit 11 identifies an operation by the user based on a signal from the input unit 14 (Step S105). In Step S105, the user selects a scout by selecting the checkbox B100, for example, or selects the instruction object P114 or the instruction object P115. The instruction abject P114 may be inhibited from being selected until the user has selected three scouts.

When the user has selected the instruction object P115 (Step S105: P115), the display returns to the contract image G102, and the processing ends. On the other hand, when the user has selected a scout (S105: scout selection), the control unit 11 displays the grade, the category, and the specialist field of each scout selected by the scout in the list L101 (Step S107). In Step S107, the control unit 11 records the serial number of each scout selected by the user in the storage unit 12, and displays the negotiating strength, which is calculated from the average grade of the scouts, in the list L101. The serial number, the grade, the category, and the specialist field of each scout may also be recorded in the storage unit 12 as data received together with the display data of the scout list image G103.

The control unit 11 grays-out scouts having a specialist field that is the same category as a scout selected by the user, and disables the checkboxes for those scouts (Step S109). In Step S109, the control unit 11 compares the category of each scout selected by the user and the categories of the scouts that have not been selected, and grays out the regions in the list L100 corresponding to scouts for which there is a match to change the checkboxes for those scouts to a "disabled" attribute, which means that those checkboxes cannot be selected.

On the other hand, in step S105, when the user has selected the instruction object P114 (Step S105: P114), the control unit 11 transmits a display request for the confirmation image G104 to the server 30 (Step S111). In Step S111, the control unit 11 transmits the serial numbers of the three scouts selected by the user together with the display request. The negotiating strength of the three scouts may be transmitted instead of the serial numbers.

In the server 30, when the display request is received, the control unit 31 refers to the scout master information table TBL 102 and the possessed scout information table TBL 104 to calculate the probability of a perfect match and the probability of a partial match (Step S303). In Step S303, the control unit 31 identifies the scout IDs associated with the serial numbers of the three scouts selected by the user, and calculates the negotiating strength based on the grades associated with those scout IDs. When the negotiating strength is to be received from the terminal 10, this calculation may be omitted. The control unit 31 then calculates the probability of a perfect match by substituting the negotiating strength into a predetermined expression, and calculates the probability of a partial match by subtracting the calculated probability of a perfect match from 100%. The processing then shifts to the processing illustrated in FIG. 19. The control unit 31 generates display data for the confirmation image G104 based on the calculation results in Step S303, and transmits the generated display data to the terminal 10 (Step S305).

In the terminal 10, when the display data is received, the control unit 11 causes the display unit 15 to display the confirmation image G104 (Step S113). The control unit 11 identifies an operation by the user based on a signal from the input unit 14 (Step S115). When the instruction object P117 has been selected by the user (Step S11S: P117), the control unit 11 returns to the processing of Step S101. When the instruction object P116 has been selected by the user (Step S115: P116), the control unit 11 transmits a display request for the acquisition image G105 (Step S117).

In the server 30, when the display request is received, the control unit 31 determines, based on the probabilities calculated in Step S303, whether or not a player character matching all of the specialist fields of the three scouts selected by the user is to be chosen (Step S307). In Step S307, based on the probabilities calculated in Step S303, the control unit 31 randomly determines, for example, among the 100 natural numbers of from 0 to 99, winning numbers equal in number to the probabilities calculated in Step S303. Then, the control unit 31 generates a random number and determines whether or not the last two digits of the generated random number correspond to a winning number. The method of determining which player character is chosen based on probability is not limited to the method described above, and for example, the determination may be performed based on an algorithm determined in advance.

When it is determined that a player character matching all of the specialist fields is to be chosen (Step S307: Y), the control unit 11 refers to the player master information table TBL 100 to choose a player character matching all of the specialist fields of the three scouts selected by the user (Step S309). In Step S309, the control unit 11 compares the attributes of the player characters stored in the player master information table TBL 100 and the specialist fields of the three scouts selected by the user, and randomly chooses one player character that is a perfect match. The player character may be chosen by a non-random method, and a plurality of player characters may be chosen as well.

Meanwhile, when it is not determined that a player character matching all of the specialist fields is to be chosen (Step S307: N), the control unit 11 refers to the player master information table TBL 100 to choose a player character matching a part of the specialist fields of the three scouts selected by the user (Step S311). In Step S311, the control unit 11 compares the attributes of the player characters stored in the player master information table TBL 100 and the specialist fields of the three scouts selected by the user, and randomly chooses one player character that partially matches the specialist fields of the three scouts selected by the user. The player character may be chosen by a non-random method, and a plurality of player characters may be chosen as well.

The control unit 31 adds the player character chosen in Step S309 or S311 to the possessed player information table TBL 103 (Step S313), and deletes the three scouts selected by the user from the possessed scout information table TBL 104 (Step S315). In Step S313, the control unit 31 generates a new record in the possessed player information table TBL 103, and refers to the player master information table TBL 100 to store a serial number issued based on a predetermined method and the details of the record in which the player ID of the player character chosen in Step S309 or S311 is stored. The serial number may be issued based on a predetermined rule so as not to duplicate another serial number. In Step S315, the control unit 31 deletes the three scouts selected by the user from the record in which the user ID is stored. The control unit 31 generates display data of the acquisition image G105 for showing the player character added to the possessed player information table TBL 103 in Step S313, and transmits the generated display data to the terminal 10 (Step S317).

In the terminal 10, when the display data is received, the control unit 11 causes the display unit 15 to display the confirmation image G104 (Step S119), and the processing ends.

According to the game system 1 described above, the user is notified of information on the possibility that a player character matching a plurality of specialist fields respectively associated with a plurality of scouts that have been selected by the user is chosen, and hence the user can select the plurality of scouts in consideration of the possibility of a desired player character being chosen. For example, the choice of player characters is started after the user is notified of the information on the possibility that a player character matching a plurality of specialist fields is chosen, and hence the user can know beforehand the possibility of the desired player character being chosen. As a result, the user can combine various scouts who have an increased possibility of the desired player character being chosen. In particular, as in this embodiment, when scouts are expended as a result of a player character being chosen, the user can avoid wastefully expending scouts even though there is only a low possibility of the desired player character being chosen.

Through the notification of information on the possibility that a player character that is a perfect match is chosen, the user is allowed to select a plurality of scouts in consideration of the possibility that a player character that perfectly matches what the user desires to acquire is chosen.

Even when a player character matching all of the plurality of specialist fields is not chosen, a player character matching a part of the plurality of specialist fields is chosen, and hence the user can choose a player character that the user desires to acquire to a certain extent. A plurality of conditions can be selected in consideration of the possibility that a player character that satisfies all of the plurality of specialist fields is chosen and the possibility that a player character that satisfies a part of the plurality of specialist fields is chosen.

There is a possibility that execution of choosing processing based on specialist fields in the same category may result in a combination of specialist fields that is not satisfied by any of the player characters. However, such a possibility may be restricted in order to allow choosing processing to be executed based on specialist fields in which a matching player character exists. For example, when a player character is chosen in the manner described in this embodiment, the player character has only one region affiliation. In this case, when a plurality of regions are set as conditions, there are no player characters having all of the plurality of regions, and hence nobody is chosen. This kind of situation can be prevented by restricting the selection of such conditions.

When the player characters have attributes, as in this embodiment, the user often desires to acquire a player character that perfectly matches the attributes of his or her own play style. In this case, the user can select a combination of attributes by selecting scouts, and hence a player character can be chosen based on the combination of attributes desired by the user, and a player character desired by the user can be chosen.

The probability that a player character matching the conditions is chosen is displayed in the confirmation image G104, and hence the user can select the plurality of conditions in consideration of the probability that a player character satisfying the plurality of conditions is chosen.

[5. Modification Examples]

The present invention is not limited to the embodiment described above, and can be modified suitably without departing from the gist of the present invention.

Figure 20:
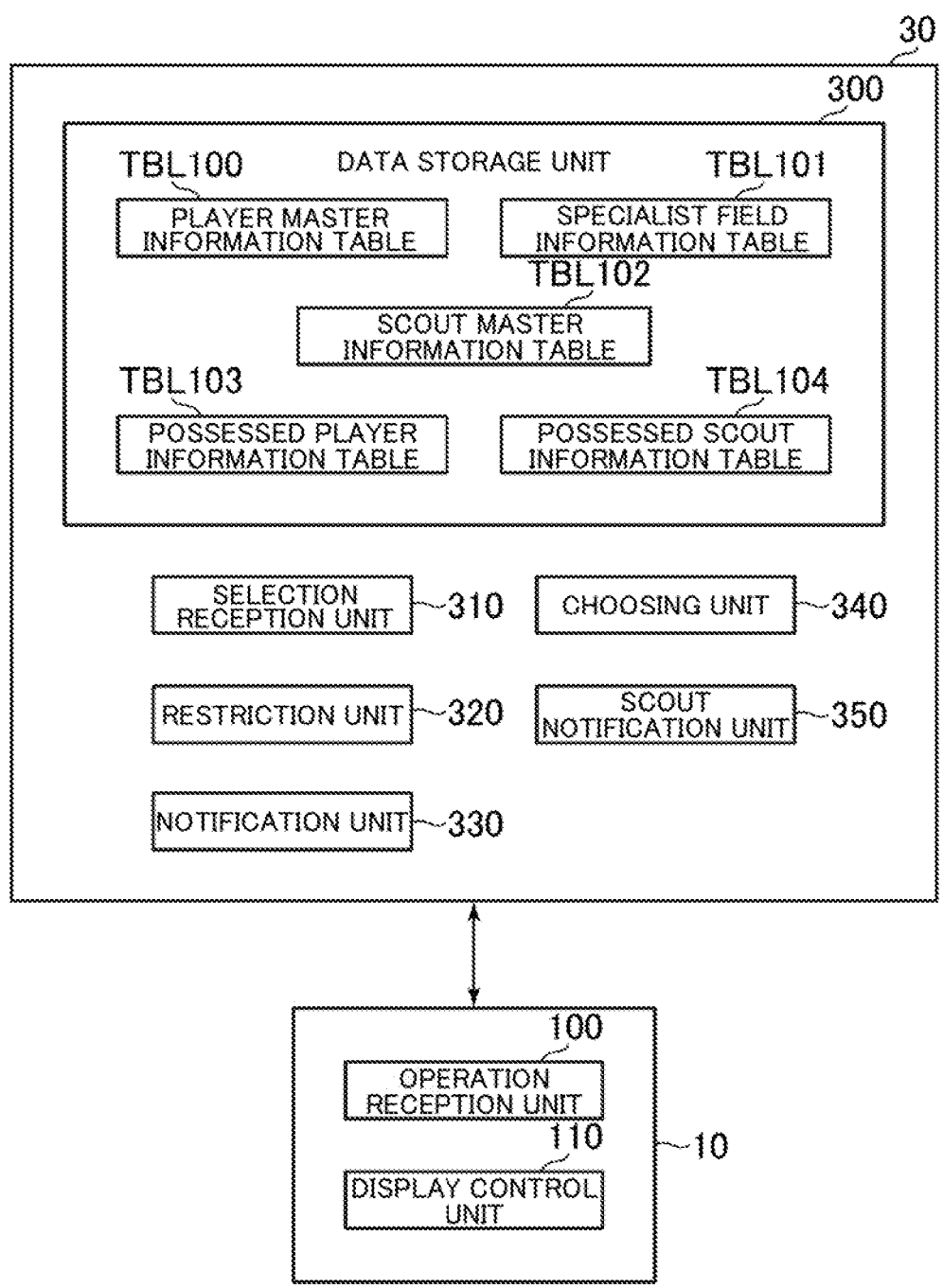
FIG. 20 is a function block diagram of a modification example.

(1) For example, FIG. 20 is a function block diagram of a modification example. As illustrated in FIG. 20, in this modification example, in addition to the functions described in the above-mentioned embodiment, a scout notification unit 350 is implemented. The scout notification unit 350 is mainly implemented by the control unit 31. The scout notification unit 350 notifies information enabling identification of, among the plurality of scouts, the scouts associated with a condition satisfied by a player character chosen by the choosing unit 340.

The term "information enabling identification" is an identifiable image or sound. For example, the information enabling identification is the act of displaying an image representing a scout, the act of subjecting the displayed image to predetermined effect processing, or the act of causing the scout displayed in the displayed image to perform a predetermined operation. Examples of the effect processing include changing the size of the image, changing the brightness, color, or pattern of the image, causing the image to flash on/off, and moving the image. Other examples may include, when the scout has a name, displaying the name and outputting the name as a sound.

Figure 21:
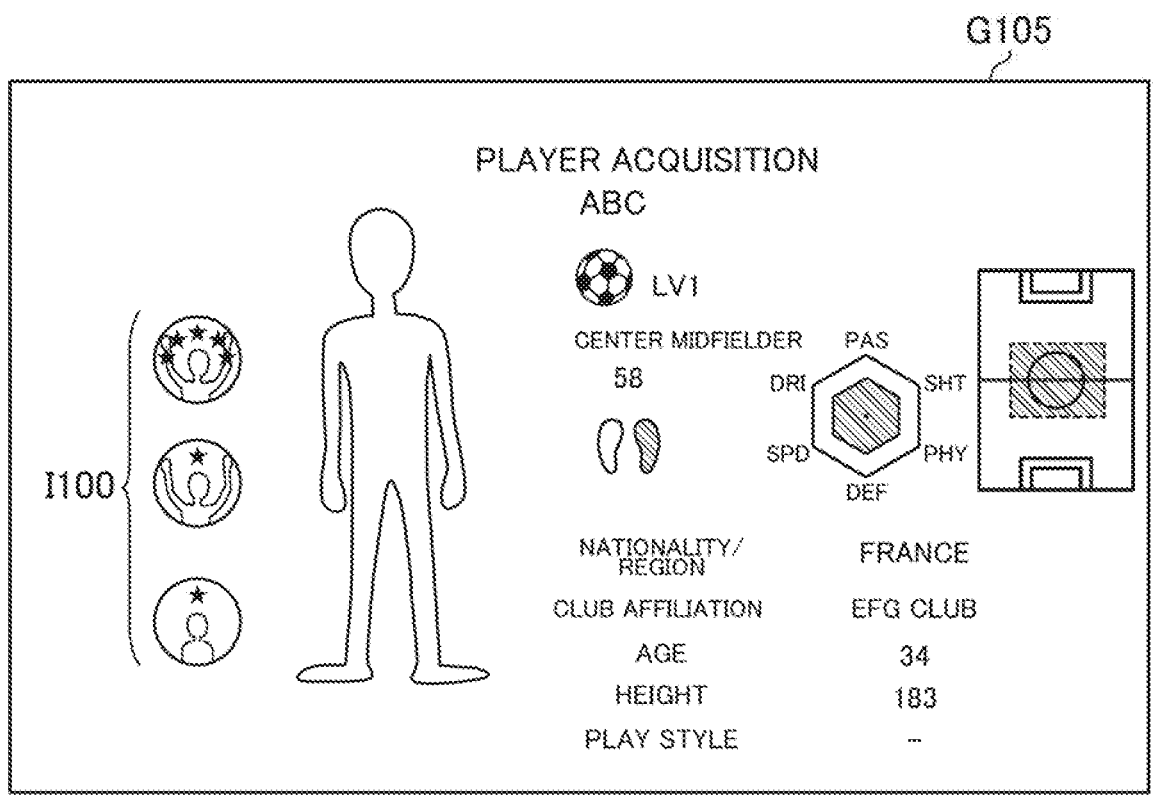
FIG. 21 is a diagram for illustrating notification of the scout having a specialist field that matches an attribute of a player character acquired by the user.

FIG. 21 is a diagram for illustrating notification of the scout having a specialist field that matches an attribute of a player character acquired by the user. In FIG. 21, there is illustrated a case in which, for example, the notification is issued in the acquisition image G105. As illustrated in FIG. 21, for example, the scout notification unit 350 plays an animated movie clip in a scout image I100 such that, of the three scouts selected by the user, the scout having the specialist field that matches the attribute of the acquired player character is raising its hands in the air in celebration.

When the player character chosen by the choosing unit 340 is a perfect match, the scout notification unit 350 executes a predetermined animated movie clip in the scout image I100 of all the scouts. On the other hand, when the player character chosen by the choosing unit 340 is a partial match, the scout notification unit 350 compares the attributes of the player character and the specialist fields of each scout, and executes a predetermined animated movie clip in the scout image I100 showing the scout(s) having the matching specialist field.

The image shown by the scout notification unit 350 for the notification may be any image. For example, the image may be an image displayed after the acquisition image G105 or an image displayed before the acquisition image G105. The scout notification unit 350 may also execute a predetermined animated movie clip in the scout image I100 for scouts having a specialist field that does not match the attributes of the player character chosen by the choosing unit 340.

In the modification example (1), the user is notified of information that enables identification of the scouts associated with the specialist fields matching the attributes of the chosen player character, and hence the user can grasp which scout selection resulted in the desired player character being chosen.

(2) In the embodiment described above, scouts are described as an example of the second object. However, the second object may be any object selected by the user. As another example, an instruction object like an option or a button displayed on the display unit 15 may correspond to the second object. In this case, the selection reception unit 310 receives a selection by the user from among a plurality of instruction objects displayed on the display unit 15. For each instruction object, there is an association between the condition for choosing the player character and the parameter that is used for choosing a player character satisfying the condition, and hence, for example, the condition and parameter are displayed in each instruction object. After the selection of the instruction object is received, the same processing as the processing described for the embodiment may be executed, and the player character may be chosen based on the condition and the parameter associated with the instruction object selected by the user.

In the embodiment described above, there is described a case in which the probability of a perfect match and the probability of a partial match are displayed in the acquisition image G105, but only the probability of a perfect match or the probability of a partial match may be displayed.

In the embodiment described above, there is described a case in which in the game system 1 the main functions are implemented by the server 30, but each function may be implemented on the terminal 10 side. In this case, the terminal 10 corresponds to the game control device, the data storage unit 300 is mainly implemented by the storage unit 12, and the other functions are each mainly implemented by the control unit 11. Each of the functions described above may also be implemented by the terminal 10 and the server 30 in a shared manner.

For example, when the data storage unit 300 is to be implemented by the server 30 and each of the other functions is to be implemented by the terminal 10, the details of each of the tables stored in the data storage unit 300 are transmitted to the terminal 10 via the network N, and the data representing the processing result obtained by the terminal 10 is transmitted to the server 30 via the network N. Then, the details of each of the tables are updated.

For example, when the selection reception unit 310 is to be implemented by the terminal 10, the selection reception unit 310 transmits the data for identifying the scouts selected by the user. When the notification unit 330 is to be implemented by the terminal 10, the probabilities may be calculated by the terminal 10, or probabilities calculated by the server 30 may be received by the terminal 10 and notified. When the choosing unit 340 is to be implemented by the terminal 10, the choosing unit 340 transmits the serial number of the chosen player character to the server 30.

The game may also be a game that is executed online by each terminal 10, and that does not require the existence of the server 30. In this case, all of the functions described above are implemented in the terminals 10.

For example, among the functions described above, the functions other than the selection reception unit 310, the notification unit 330, and the choosing unit 340 may be omitted in the game system 1. Further, for example, in the embodiment described above, there is described an example in which a game character is chosen. However, the present invention can also be applied to a game system 1 configured to execute a game configured so that various objects, such as game items and game characters, are chosen.

[6. Supplementary Notes]

From the description given above, the present invention is understood as follows, for example. In order to facilitate understanding of the present invention, the reference symbols provided in the drawings are enclosed in parentheses and assigned to components appropriately. However, the present invention is not to be limited to the modes illustrated in the drawings as a result of this.

(1) A game system according to one embodiment of the present invention includes at least one processor configured to: receive a selection of at least one of a plurality of second objects each associated with one of a plurality of conditions for choosing a first object and one of a plurality of parameters that is used for choosing the first object satisfying the one of the plurality of conditions; notify a user by displaying information on a possibility that the first object satisfying the plurality of conditions respectively associated with the plurality of second objects is chosen, by using the plurality of parameters respectively associated with the plurality of second objects, when a selection of the plurality of second objects is received; and choose the first object satisfying the plurality of conditions by using the plurality of parameters.

(8) A game control device according to one embodiment of the present invention includes at least one processor configured to: receive a selection of at least one of a plurality of second objects each associated with one of a plurality of conditions for choosing a first object and one of a plurality of parameters that is used for choosing the first object satisfying the one of the plurality of conditions; notify a user by displaying information on a possibility that the first object satisfying the plurality of conditions respectively associated with the plurality of second objects is chosen, by using the plurality of parameters respectively associated with the plurality of second objects, when a selection of the plurality of second objects is received; and choose the first object satisfying the plurality of conditions by using the plurality of parameters.

(9) Further, a program according to one embodiment of the present invention causes a computer to function as the game system described in any one of Items (1) to (7) or as the game control device described in Item (8).

(10) Further, an information storage medium according to one embodiment of the present invention is a computer-readable storage medium having recorded thereon the program described in Item (9).

(2) According to one embodiment of the present invention, the at least one processor is configured to notify a user by displaying information on a possibility that the first object satisfying all of the plurality or conditions is chosen.

(3) According to one embodiment of the present invention, the at least one processor is configured to: choose the first object satisfying a part of the plurality of conditions when the first object satisfying all of the plurality of conditions is not chosen; and further notify a user by displaying information on a possibility that the first object satisfying a part of the plurality of conditions is chosen.

(4) According to one embodiment of the present invention, the at least one processor is configured to notify a user by displaying information enabling identification of one of the plurality of second objects that is associated with one of the plurality of conditions satisfied by the chosen first object.

(5) According to one embodiment of the present invention, the plurality of conditions each relate to at least one of a plurality of categories, and the at least one processor is configured to restrict execution of processing for choosing the first object based on the plurality of conditions relating to the same one of the plurality of categories.

(6) According to one embodiment of the present invention, the first object includes at least one of a plurality of attribute types, and the plurality of conditions include a condition that a specific attribute among the plurality of attribute types is included.

(7) According to one embodiment of the present invention, the information includes a probability that the first object satisfying the plurality of conditions is chosen.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game system comprising:
at least one processor, the at least one processor configured to:
receive a selection of second objects, each second object associated with at least a first condition from among a plurality of conditions for choosing a first object and at least a first parameter from among a plurality of parameters that is used for acquiring a possibility of choosing the first object satisfying the first condition,
wherein the selection of second objects is associated with a second object list image which is transmitted to a user;
wherein the processor is further configured to disable an input of user selection on the second object list image based on a condition;
wherein the user selects the second objects;
wherein the second object list image is adjusted based on the user's selection;

acquire the possibility of choosing the first object satisfying the plurality of conditions respectively associated with the second objects, by using the plurality of parameters respectively associated with the second objects, when the selection of the second objects is received;

notify the user by displaying the possibility; and choose the first object satisfying the plurality of conditions by using the possibility;

wherein the at least one processor is configured to notify the user by displaying information on the possibility that the first object satisfying all of the plurality of conditions is chosen;

choose the first object satisfying at least one of the plurality of conditions when the first object satisfying all of the plurality of conditions is not chosen; and further notify the user by displaying information on a possibility that the first object satisfying the at least one of the plurality of conditions is chosen;

wherein the first objects are stored in a data storage unit including information for an initial overall value, a rarity, a league affiliation, a position, and initial ability values; and wherein the second objects are stored in a data storage unit including information for specialist field and a category.

2. The game system according to claim 1, wherein the at least one processor is configured to notify the user by displaying information enabling identification of one of the second objects that are associated with one of the plurality of conditions satisfied by the chosen first object.

3. The game system according to claim 1,
wherein the plurality of conditions each relate to at least one of a plurality of categories, and
wherein the at least one processor is configured to restrict execution of processing for choosing the first object based on the plurality of conditions relating to the same one of the plurality of categories.

4. The game system according to claim 1,
wherein the first object includes at least one of a plurality of attribute types, and
wherein the plurality of conditions include a condition that a specific attribute among the plurality of attribute types is included.

5. The game system according to claim 1,
wherein the possibility includes a probability that the first object satisfying the plurality of conditions is chosen.

6. The game system according to claim 1, wherein the second objects are scouts.

7. The game system according to claim 1, wherein the at least one processor is configured to indirectly notify the user of the possibility.

8. The game system according to claim 1, wherein the at least one processor is configured to directly notify the user of the possibility by displaying a number representing the possibility.

9. A game control device comprising:
at least one processor, the at least one processor configured to:
receive a selection of second objects, each second object associated with at least a first condition from among a plurality of conditions for choosing a first object and at least a first parameter from among a plurality of parameters that is used for acquiring a possibility of choosing the first object satisfying the first condition;

wherein the selection of second objects is associated with a second object list image which is transmitted to a user;

wherein the processor is further configured to disable an input of user selection on the second object list image based on a condition;

wherein the user selects the second objects;

wherein the second object list image is adjusted based on the user's selection;

acquire the possibility of choosing the first object satisfying the plurality of conditions respectively associated with the second objects, by using the plurality of parameters respectively associated with the second objects, when the selection of the second objects is received;

notify the user by displaying the possibility; and choose the first object satisfying the plurality of conditions by using the possibility;

wherein the at least one processor is configured to notify the user by displaying information on the possibility that the first object satisfying all of the plurality of conditions is chosen;

choose the first object satisfying at least one of the plurality of conditions when the first object satisfying all of the plurality of conditions is not chosen; and further notify the user by displaying information on a possibility that the first object satisfying the at least one of the plurality of conditions is chosen;

wherein the first objects are stored in a data storage unit including information for an initial overall value, a rarity, a league affiliation, a position, and initial ability values; and wherein the second objects are stored in a data storage unit including information for specialist field and a category.

10. A non-transitory computer-readable information storage medium having recorded thereon a program for causing a computer to:

receive a selection of second objects, each second object associated with at least a first condition from among a plurality of conditions for choosing a first object and at least a first parameter from among a plurality of parameters that is used for acquiring a possibility of choosing the first object satisfying the first condition;

wherein the selection of second objects is associated with a second object list image which is transmitted to a user;

wherein the computer is configured to disable an input of user selection on the second object list image based on a condition;

wherein the user selects the second objects;

wherein the second object list image is adjusted based on the user's selection;

acquire the possibility of choosing the first object satisfying the plurality of conditions respectively associated with the second objects, by using the plurality of parameters respectively associated with the second objects, when the selection of the second objects is received;

notify the user by displaying the possibility; and choose the first object satisfying the plurality of conditions by using the possibility;

wherein the at least one processor is configured to notify the user by displaying information on the possibility that the first object satisfying all of the plurality of conditions is chosen;

choose the first object satisfying at least one of the plurality of conditions when the first object satisfying all of the plurality of conditions is not chosen; and further notify the user by displaying information on a possibility that the first object satisfying the at least one of the plurality of conditions is chosen;

wherein the first objects are stored in a data storage unit including information for an initial overall value, a rarity, a league affiliation, a position, and initial ability values; and wherein the second objects are stored in a data storage unit including information for specialist field and a category.

\* \* \* \* \*